United States Patent
Belden et al.

(10) Patent No.: US 12,300,882 B1
(45) Date of Patent: May 13, 2025

(54) RADOME WITH MELT-PROCESSABLE FLUOROPOLYMER

(71) Applicant: Space Exploration Technologies Corp., Hawthorne, CA (US)

(72) Inventors: Samuel Belden, Redondo Beach, CA (US); Darya Malkova, Seattle, WA (US); David Milroy, Kirkland, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 188 days.

(21) Appl. No.: 17/541,062

(22) Filed: Dec. 2, 2021

Related U.S. Application Data

(60) Provisional application No. 63/277,458, filed on Nov. 9, 2021, provisional application No. 63/120,703, filed on Dec. 2, 2020.

(51) Int. Cl.
*H01Q 1/42* (2006.01)
*C08K 3/22* (2006.01)
*C08K 3/40* (2006.01)
*H01Q 21/06* (2006.01)

(52) U.S. Cl.
CPC .............. *H01Q 1/422* (2013.01); *C08K 3/22* (2013.01); *C08K 3/40* (2013.01); *H01Q 21/065* (2013.01); *C08K 2003/2241* (2013.01)

(58) Field of Classification Search
CPC ........ H01Q 1/48; H01Q 21/065; H01Q 1/422; H01Q 1/42; C08K 3/22; C08K 3/40; C08K 2003/2241
See application file for complete search history.

(56) References Cited

U.S. PATENT DOCUMENTS

| | | | |
|---|---|---|---|
| 8,855,730 B2 * | 10/2014 | Sanford | H01Q 21/065 455/90.3 |
| 11,050,144 B1 * | 6/2021 | Hersh | H05K 5/0213 |
| 2018/0375203 A1 * | 12/2018 | Petra | H01Q 1/427 |
| 2019/0296428 A1 * | 9/2019 | Hashimoto | H01Q 1/02 |
| 2020/0381814 A1 * | 12/2020 | Yetisir | H01Q 15/144 |
| 2021/0351501 A1 * | 11/2021 | Hersh | H01Q 1/405 |
| 2021/0403711 A1 * | 12/2021 | Buzinkai | H01Q 1/42 |

FOREIGN PATENT DOCUMENTS

WO 2020247558 A2 12/2020

* cited by examiner

*Primary Examiner* — David E Lotter
(74) *Attorney, Agent, or Firm* — Polsinelli PC

(57) ABSTRACT

An antenna assembly may include a housing including a radome having at least an outer layer made of a melt-processable fluoropolymer material. The antenna assembly may further include an antenna system disposed within the housing.

20 Claims, 18 Drawing Sheets

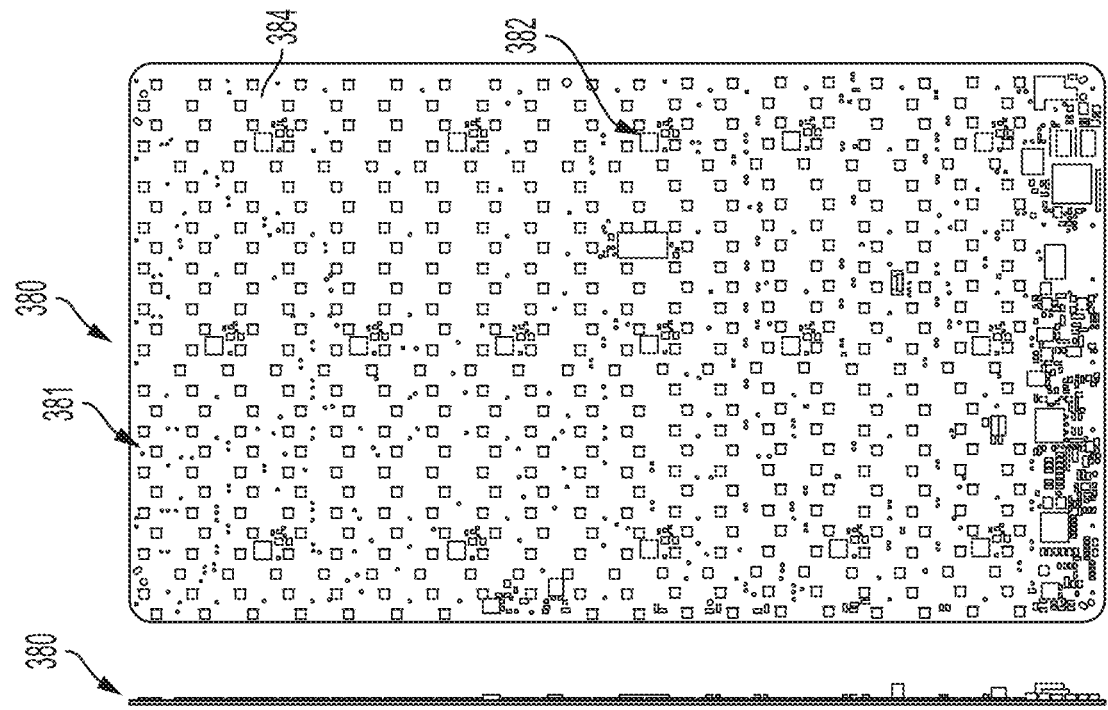
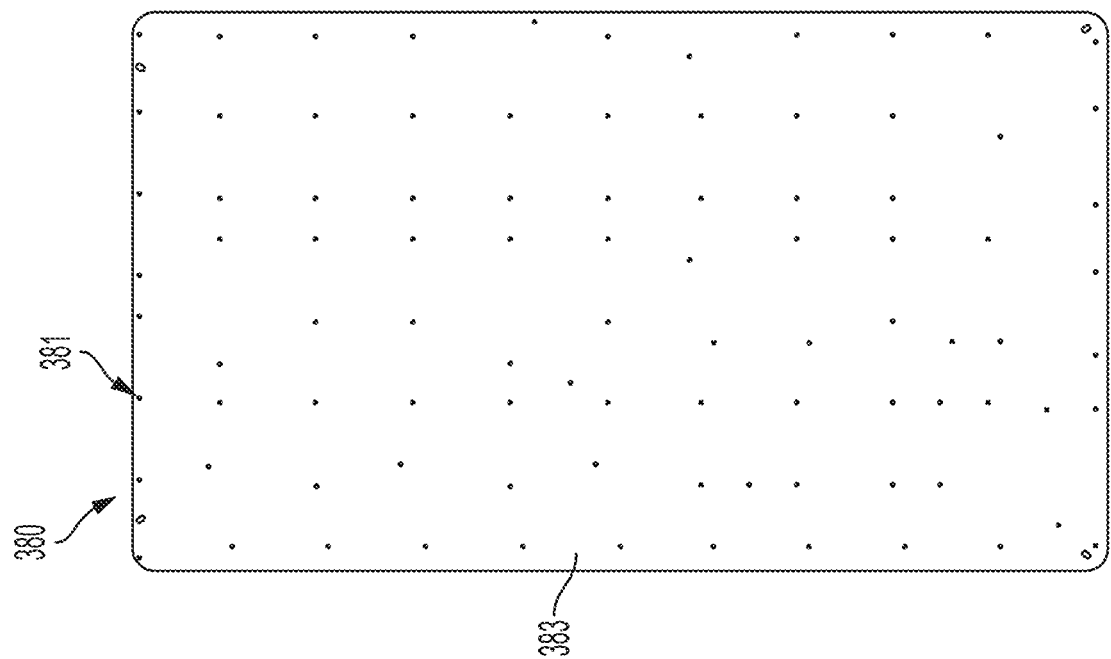

RADOME WITH MELT-PROCESSABLE FLUOROPOLYMER

CROSS-REFERENCES TO RELATED APPLICATIONS

This application claims the benefit and priority of U.S. Provisional Application No. 63/120,703, titled RADOME FOR ANTENNA ASSEMBLY and filed on Dec. 2, 2020, and U.S. Provisional Application No. 63/277,458, titled RADOME WITH MELT-PROCESSABLE FLUOROPOLYMER filed on Nov. 9, 2021, the disclosure of both being expressly incorporated by reference herein in their entirety.

FIELD

The present disclosure pertains to antenna apparatuses for satellite communication systems.

BACKGROUND

Satellite communication systems generally involve Earth-based antennas in communication with a constellation of satellites in orbit. Earth-based antennas are, of consequence, exposed to weather and other environmental conditions. Therefore, described herein are antenna apparatuses and their housing assemblies designed to be both functional and durable to protect internal antenna elements from environmental conditions while enabling radio frequency communications with a satellite communication system, such as a constellation of satellites.

SUMMARY

In accordance with various embodiments of the present disclosure, an antenna assembly may include a housing including a radome having at least an outer layer made of a melt-processable fluoropolymer material. The antenna assembly may further include an antenna system disposed within the housing.

In accordance with various embodiments of the present disclosure, an outer layer for use with a radome assembly for an antenna assembly includes a planar surface formed from a melt-processable fluoropolymer material and having a first side configured to be coupled to a radome body portion and a second side configured to be exposed to an environment of the antenna assembly. The outer layer further includes a pressure sensitive adhesive (PSA) coupled to the first side of the planar surface and configured to couple the first side of the planar surface to the radome body portion.

In accordance with various embodiments of the present disclosure, a radome assembly for use with an antenna assembly includes a radome body portion configured as part of a housing for the antenna assembly. The radome assembly further includes a planar surface formed from a melt-processable fluoropolymer material and having a first side configured to be coupled to the radome body portion and a second side configured to be exposed to an environment of the antenna assembly.

In accordance with various embodiments of the present disclosure, a radome assembly for use with an antenna assembly includes a radome body portion having a first side and a second side. The radome assembly further includes an outer layer formed from a first material, configured to be coupled to the first side of the radome body portion, and configured to be exposed to an environment of the radome.

In accordance with various embodiments of the present disclosure, a radome assembly for use with an antenna assembly includes a radome body portion having a first side and a second side. The radome assembly further includes an outer layer formed from a first material, configured to be coupled to the first side of the radome body portion, and configured to be exposed to an environment of the radome. The radome assembly further includes a radome spacer portion extending from the second side of the radome body portion and configured to space the radome body portion and the outer layer from antenna elements of the antenna assembly.

In accordance with various embodiments of the present disclosure, a method of assembling a radome assembly includes obtaining a radome body portion having a first side and a second side. The method further includes coupling an outer layer to the radome body portion by positioning a surface of the outer layer having a pressure sensitive adhesive (PSA) adjacent to the first side of the radome body portion and applying pressure to the outer layer.

In accordance with various embodiments of the present disclosure, a radome assembly for use with an antenna assembly includes a radome body portion having a first surface and a second surface opposite the first surface. The radome assembly further includes a radome spacer portion extending from the second surface of the radome body portion and including a plurality of cells that are formed from a plurality of cell walls, at least two cell walls defining a cell of the plurality of cells being spaced apart from each other.

In accordance with various embodiments of the present disclosure, a radome assembly for use with an antenna assembly includes a radome body portion having a first surface and a second surface opposite the first surface. The radome assembly further includes a radome spacer portion extending from the second surface of the radome body portion and including a plurality of cells that are formed from a plurality of cell walls, at least two cell walls defining a cell of the plurality of cells being spaced apart from each other. The radome assembly further includes an outer layer coupled to the first surface of the radome body portion.

In accordance with various embodiments of the present disclosure, a radome spacer portion for spacing a radome body portion from antenna elements of an antenna assembly includes a plurality of cell walls defining a plurality of cells that each include a vertical pathway that is configured to be aligned with an antenna element, at least two cell walls defining a cell of the plurality of cells being spaced apart from each other.

In accordance with various embodiments of the present disclosure, a radome body assembly for use with an antenna assembly includes a radome body portion. The radome body assembly further includes a plurality of elongated members each coupled to the radome body portion and having a proximal end at or near the radome body portion and a distal end extending away from the radome body portion, the distal end of each of the plurality of elongated members being configured to extend through at least one opening defined in the antenna assembly.

In accordance with various embodiments of the present disclosure, an antenna assembly includes an antenna patch assembly including a second element that defines a plurality of openings. The antenna assembly further includes a radome body assembly having: a radome body portion, and a plurality of elongated members each coupled to the radome body portion and having a proximal end at or near the radome body portion and a distal end extending away from the radome body portion, the distal end of each of the plurality of elongated members being configured to extend through a corresponding opening of the plurality of openings.

In accordance with various embodiments of the present disclosure, a method of assembling an antenna assembly includes obtaining a plurality of elements of the antenna assembly including at least a radome body assembly having a radome body portion and a plurality of elongated members each coupled to the radome body portion and having a proximal end at or near the radome body portion and a distal end extending away from the radome body portion and at least a second element defining a plurality of openings. The method further includes extending each of the plurality of heat stakes through a respective opening of the plurality of openings. The method further includes deforming the distal end of each of the heat stakes to fasten the radome spacer to the second layer.

In accordance with various embodiments of the present disclosure, a housing for an antenna assembly includes a top portion. The housing further includes a lower enclosure that is coupled to the top portion using vibration welding such that a volume is defined between the top portion and the lower enclosure.

In accordance with various embodiments of the present disclosure, an antenna assembly, includes a radome body assembly. The antenna assembly further includes a lower enclosure that is coupled to the radome body assembly using vibration welding such that a volume is defined between the radome body assembly and the lower enclosure. The antenna assembly further includes at least one antenna layer located within the volume.

In accordance with various embodiments of the present disclosure, a method of assembling an antenna assembly includes obtaining a top portion, a lower enclosure, and at least one antenna layer. The method further includes positioning the at least one antenna layer in a volume defined between the top portion and the lower enclosure. The method further includes coupling, using vibration welding, the top portion to the lower enclosure to enclose the at least one antenna layer within the volume.

In accordance with various embodiments of the present disclosure, a dielectric layer for use in an antenna assembly includes a planar body formed using a dielectric material. The dielectric layer further includes a plurality of openings defined by the planar body and surrounding a plurality of portions of the dielectric material, each of the plurality of portions of the dielectric material being configured to be aligned with an antenna element of a plurality of antenna elements of the antenna assembly.

In accordance with various embodiments of the present disclosure, an antenna assembly includes a printed circuit board (PCB) assembly. The antenna assembly further includes at least one antenna layer at least partially forming a plurality of antenna elements. The antenna assembly further includes a dielectric layer located between the PCB assembly and the at least one antenna layer and having a dielectric constant of between 2.5 and 3.5 and a coefficient of thermal expansion (CTE) of between 15 parts per million per degree Celsius (ppm/° C.) and 25 ppm/° C.

In accordance with various embodiments of the present disclosure, a method of assembling an antenna assembly includes obtaining at least one antenna layer at least partially forming a plurality of antenna elements. The method further includes obtaining a printed circuit board (PCB) assembly. The method further includes obtaining a dielectric layer having a planar body formed using a dielectric material, and a plurality of openings defined by the planar body and surrounding a plurality of portions of the dielectric material. The method further includes stacking the dielectric layer between the at least one antenna layer and the PCB assembly such that each of the plurality of portions of the dielectric material is aligned with an antenna element of the plurality of antenna elements.

DESCRIPTION OF THE DRAWINGS

FIG. 9A is a top view of a printed circuit board (PCB) assembly of the antenna assembly of FIGS. 2A and 2B in accordance with embodiments of the present disclosure;

FIG. 9B is a cross-sectional view of a portion of the PCB assembly of FIG. 9A in accordance with embodiments of the present disclosure;

FIG. 9C is a bottom view of the PCB assembly of FIG. 9A illustrating electronic components of the PCB assembly in accordance with embodiments of the present disclosure;

DETAILED DESCRIPTION

Figure 1:
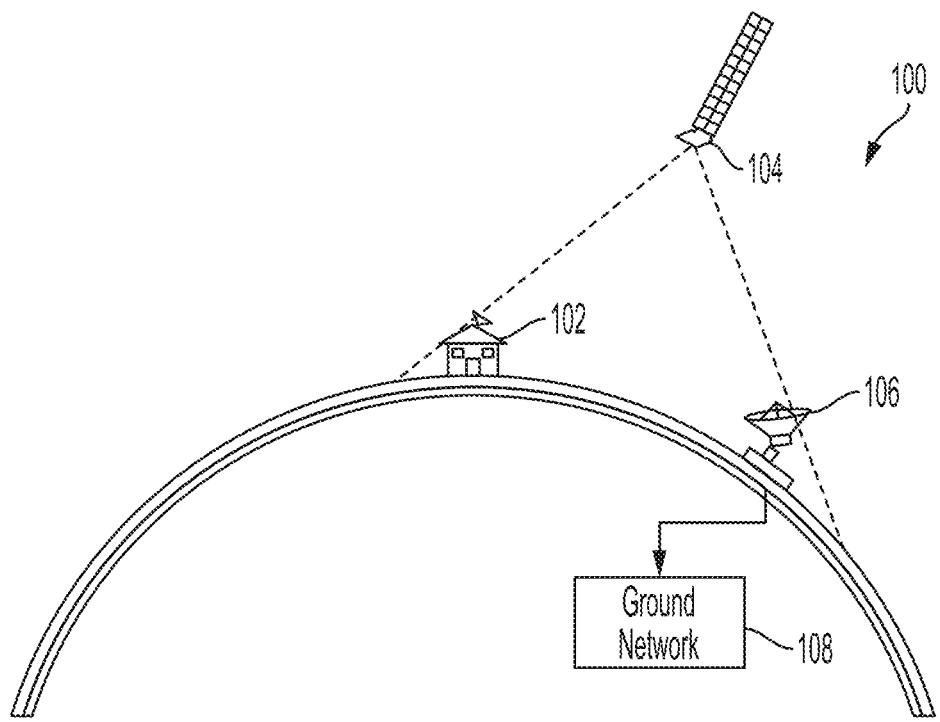
FIG. 1 is a not-to-scale diagram illustrating a simple example of communication in a satellite communication system in accordance with embodiments of the present disclosure.

Various embodiments of the disclosure are discussed in detail below. While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Language such as "top", "bottom", "upper", "lower", "vertical", "horizontal", "lateral", in the present disclosure is meant to provide orientation for the reader with reference to the drawings and is not intended to be the required orientation of the components or to impart orientation limitations into the claims.

Embodiments of the present disclosure are directed to antenna apparatuses including antenna systems designed for sending and/or receiving radio frequency signals to and/or from a satellite or a constellation of satellites.

The antenna systems of the present disclosure may be employed in communication systems providing relatively high-bandwidth, low-latency network communication via a constellation of satellites. Such constellation of satellites may be in a non-geosynchronous Earth orbit (GEO), such as a low Earth orbit (LEO). FIG. 1 illustrates a not-to-scale embodiment of an antenna and satellite communication system 100 in which embodiments of the present disclosure may be implemented. As shown in FIG. 1, an Earth-based endpoint or user terminal 102 is installed at a location directly or indirectly on the Earth's surface such as house or other building, tower, a vehicle (e.g., land-based vehicle, watercraft, aircraft, spacecraft, or the like), or another location where it is desired to obtain communication access via a network of satellites. An Earth-based endpoint terminal 102 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a geographically stationary or substantially stationary object, such as a platform or a balloon.

A communication path may be established between the endpoint terminal 102 and a satellite 104. In the illustrated embodiment, the first satellite 104, in turn, establishes a communication path with a gateway terminal 106. In another embodiment, the satellite 104 may establish a communication path with another satellite prior to communication with a gateway terminal 106. The gateway terminal 106 may be physically connected via fiber optic, Ethernet, or another physical connection to a ground network 108. The ground network 108 may be any type of network, including the Internet. While one satellite 104 is illustrated, communication may be with and between any one or more satellite of a constellation of satellites.

Figure 2A:
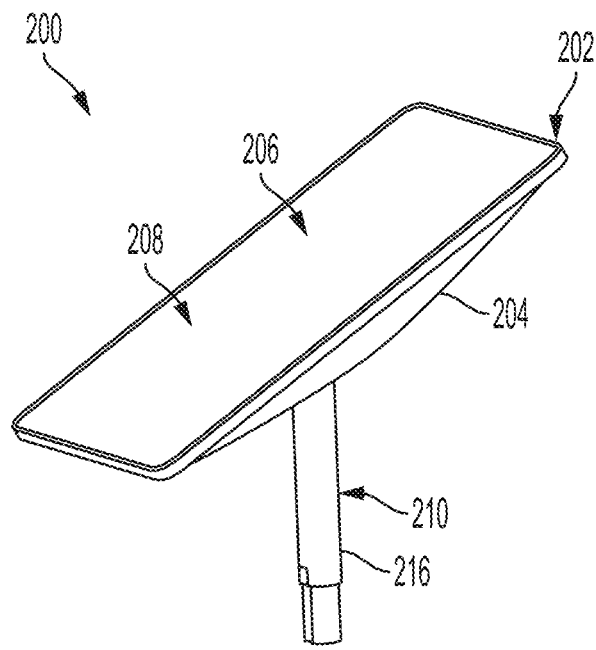
FIG. 2A is an isometric top view depicting an exemplary antenna apparatus in accordance with embodiments of the present disclosure.
Figure 2B:
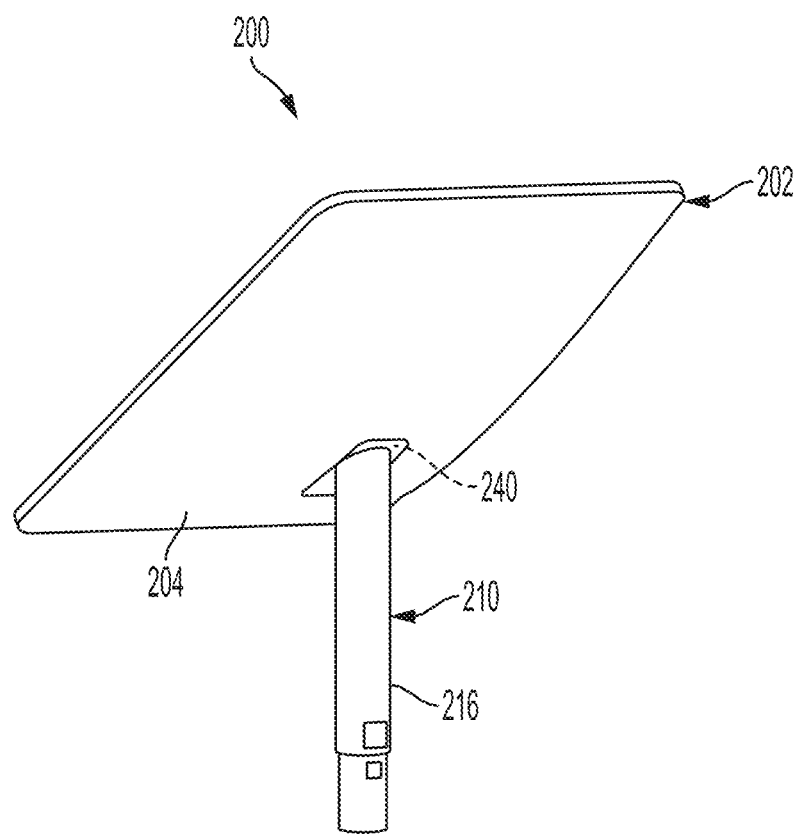
FIG. 2B is an isometric bottom view depicting exemplary antenna apparatus of FIG. 2A, showing a housing secured to a leg that is designed to be mounted to a surface in accordance with embodiments of the present disclosure.

The endpoint or user terminal 102 may include an antenna apparatus 200, for example, as illustrated in FIGS. 2A and 2B. As shown, the antenna apparatus may include a housing assembly 202, which includes a radome portion 206 and a lower enclosure 204 that couples to the radome portion 206. An antenna system and other electronic components, as described below, are disposed within the housing assembly 202. In accordance with embodiments of the present disclosure, the antenna apparatus 200 and its housing 202 may include materials for durability and reliability in an outdoor environment as well as facilitating the sending and/or receiving radio frequency signals to and/or from a satellite or a constellation of satellites with the satellites 104.

FIG. 2B illustrates a perspective view of an underside of the antenna apparatus 200. As shown, the antenna apparatus 200 may include a lower enclosure 204 that couples to the radome portion 206 to define the housing 202. In the illustrated embodiment, the mounting system 210 includes a leg 216 (a "mast") and a base (a "mount," not shown). The base may be securable to a surface and configured to receive a bottom portion of the leg 216. The leg 216, shown as a single mounting leg, may be defined by a generally hollow cylindrical or tubular body, although other shapes may be suitably employed. With a hollow configuration, any necessary wiring or electrical connections may extend into and within the interior of the leg 204 up into the housing 202 of the antenna apparatus 200.

A tilting mechanism 240 (details not shown) disposed within the lower enclosure 204 permits a degree of tilting to point the face of the radome portion 206 at a variety of angles for optimized communication and for rain and snow run-off. Such tilting may be automatic or manual.

Returning to FIG. 1, the antenna apparatus 200 is configured to be mounted on a mounting surface for an unimpeded view of the sky. As not limiting examples, the antenna apparatus 200 may be mounted at an Earth-based fixed position, for example, the roof or wall of a building, a tower, a natural structure, a ground surface, an atmospheric platform or balloon, or on a moving vehicle, such as a land vehicle, airplane, or boat, or to any other appropriate mounting surface having an unimpeded view of with the sky for satellite communication.

In various embodiments, the antenna apparatus 200 includes an antenna system designed for sending and/or receiving radio frequency signals to and/or from a satellite or a constellation of satellites. The antenna system, as described below, is disposed in the housing assembly 202 and may include an antenna aperture 208 (see FIG. 2A) defining an area for transmitting and receiving signals, such as a phased array antenna system or another antenna system. Besides the antenna aperture 208, the antenna apparatus 200 may include other electronic components within the housing assembly 202, for example, which may include, but are not limited to beamformers, a modem, a Wifi card and/or Wifi antennas, a GPS antenna, as well as other components.

Figure 3A:
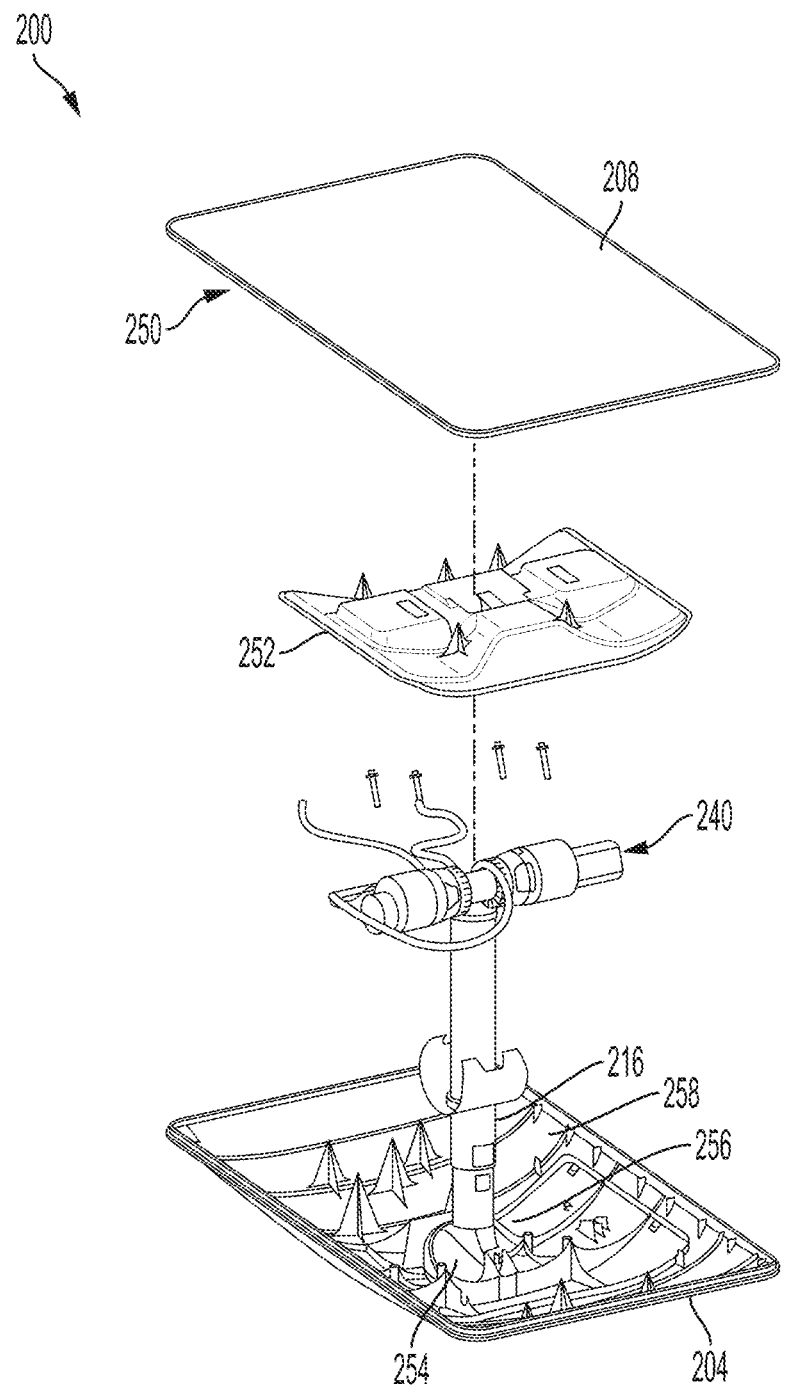
FIG. 3A is an isometric exploded view depicting a housing assembly of the antenna assembly of FIGS. 2A and 2B in accordance with embodiments of the present disclosure.

Turning to FIG. 3A, the antenna apparatus 200 may include an antenna stack 250, an internal cover 252, a lower enclosure 204, and a tilting mechanism 240 coupled to a leg 216. The leg 216 may extend through an opening 254 defined by the lower enclosure 204 and may couple to the tilting mechanism 240. A volume 258 may be defined between the antenna stack 250 and the lower enclosure 240. The internal cover 252 may be coupled to the lower enclosure within the volume 258, forming an inner volume 256 between the internal cover 252 and the lower enclosure 204. The coupling between the internal cover 252 and the lower enclosure 204 may be waterproof or water resistant (i.e., the internal cover 252 may be hermetically sealed to the lower enclosure 204), and the opening 254 may be defined within the inner volume 256. In that regard, any debris or moisture that enters the inner volume 256 via the opening 254 may remain within the inner volume 256, reducing the likelihood of such debris or moisture reaching the remainder of the volume 258 (including the antenna stack 250).

The tilting mechanism 240 may be coupled to at least one of the lower enclosure 204 and the internal cover 252 such that rotation of the tilting mechanism 240 relative to the leg 216 results in rotation of the antenna stack 250 relative to the leg 216. Such rotation may be used to physically adjust of the position of the antenna aperture 208.

Figure 3B:
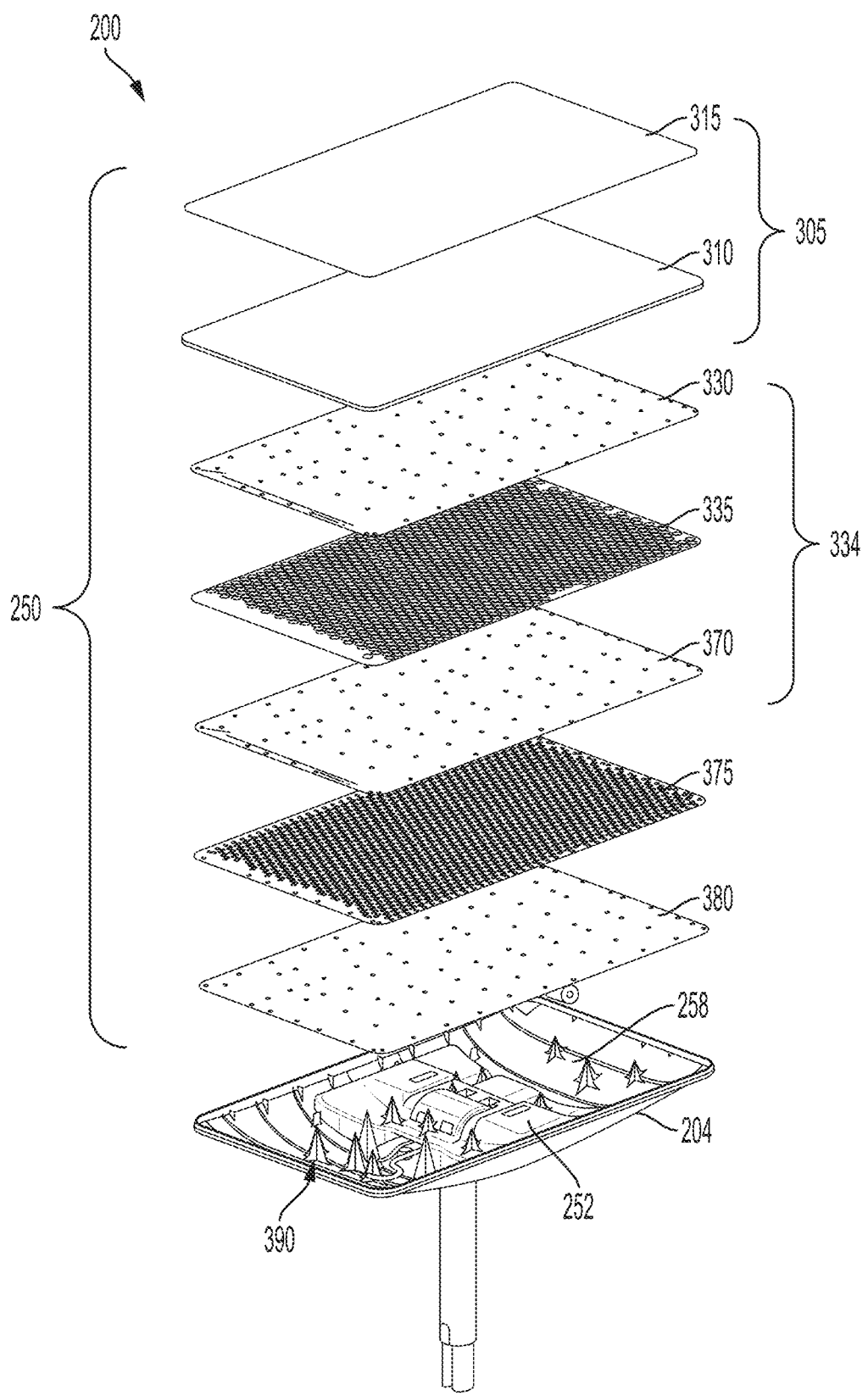
FIG. 3B is an isometric exploded view depicting various elements of an antenna stack of the antenna assembly of FIGS. 2A and 2B in accordance with embodiments of the present disclosure.

FIG. 3B illustrates an exploded view of the antenna assembly 250, showing various layers of the antenna stack 250. For example, the antenna stack 250 may include a radome assembly 305 which may include a radome body assembly 310 and an outer layer 315. The antenna stack 250 may further include a patch antenna assembly 334 that includes an upper patch antenna layer 330, an antenna spacer 335, and a lower patch antenna layer 370 which together form a plurality of patch antennas forming an antenna array. The antenna stack 250 may also include a dielectric layer 375 and a printed circuit board (PCB) assembly 380. As will be discussed further below, the various layers of the antenna stack 250 may be at least partially mechanically and electrically coupled together.

As shown in the illustrated embodiment, the layers of the antenna stack 250 may be rectangular in shape. That is, each of the radome assembly 305, patch antenna assembly 334, dielectric layer 375, and PCB assembly 380 may have a rectangular shape when viewed from above or below (i.e., along a stacking axis of the antenna assembly 250). However, one skilled in the art will realize that the shape of the antenna stack 250 (and all elements therein) may have any shape such as rectangular, square, circular, oval, square, and the like, and may have any additional features such as rounded corners, sharp corners, and the like. As shown each element of the antenna stack 250 may have similar lengths and widths (as well as the lower enclosure 204). As will be further discussed below, the radome assembly 305 may have a slightly greater length and a slightly greater width than the remaining elements of the antenna stack 250 to facilitate coupling of the radome assembly 305 to the lower enclosure 204 in such a manner to cause the remaining elements of the antenna stack 250 to remain wholly enclosed within the volume 258. However, one skilled in the art will realize that the various layers may have different dimensions.

Radome Assembly

Figure 4A:
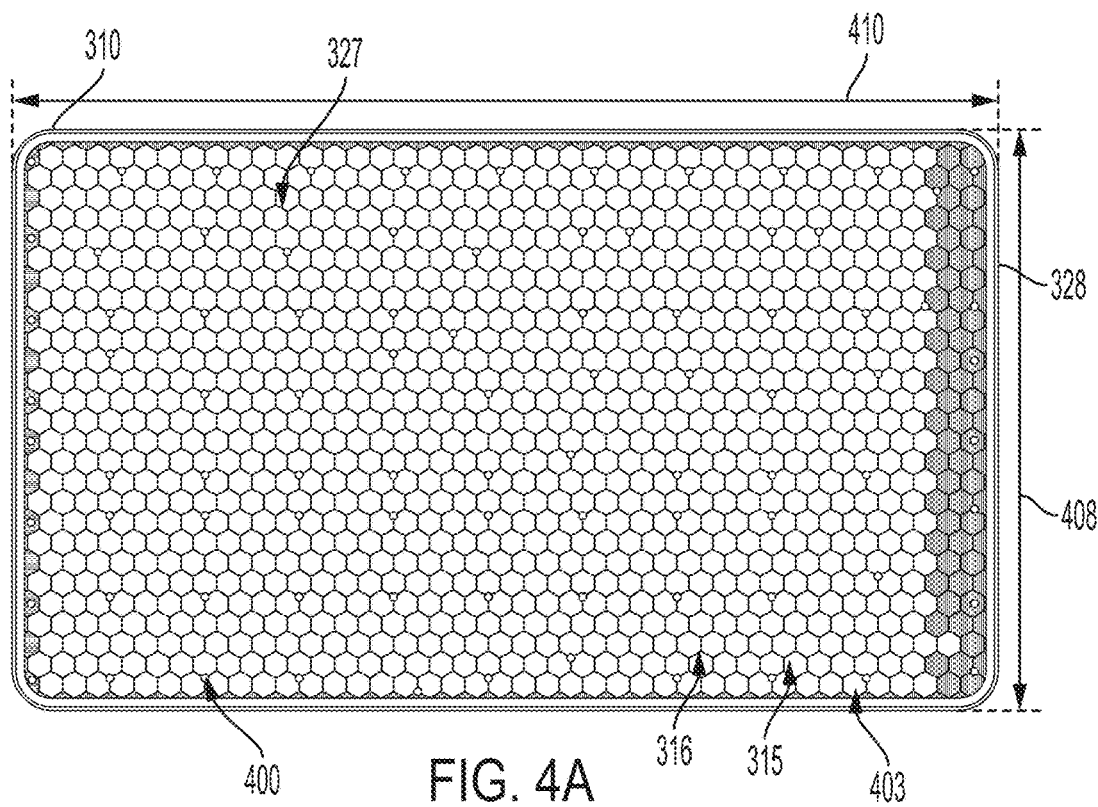
FIG. 4A is a bottom view of a radome assembly of the antenna assembly of FIGS. 2A and 2B in accordance with embodiments of the present disclosure.
Figure 4B:
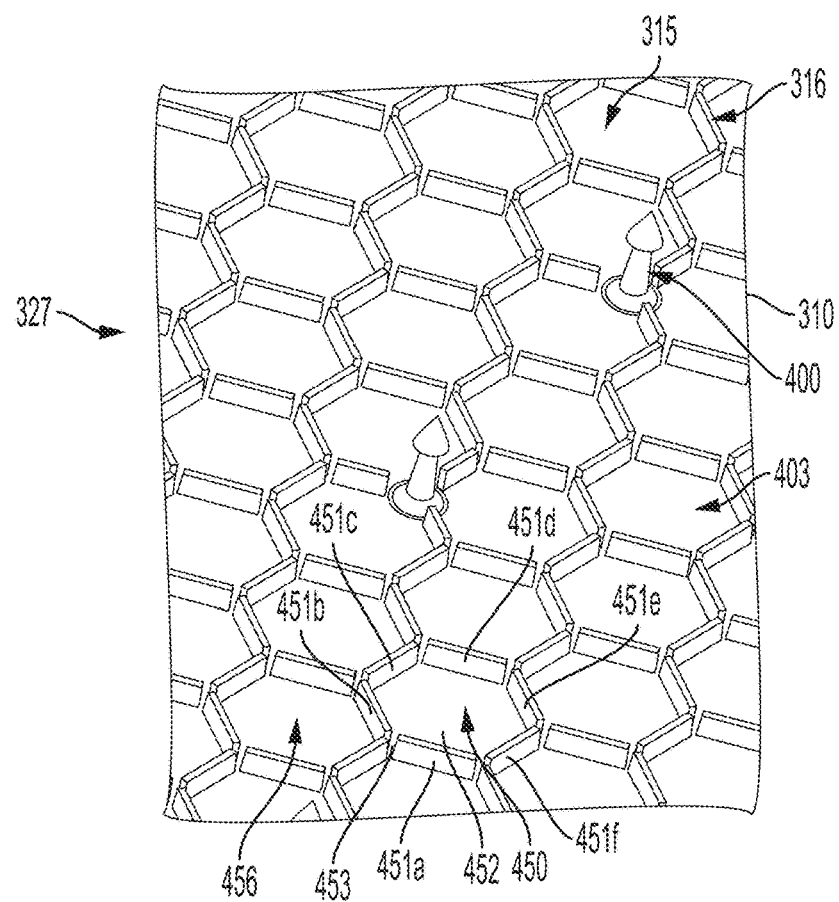
FIG. 4B is an enlarged isometric view of a portion of the bottom of the radome assembly of the antenna assembly of FIGS. 2A and 2B in accordance with embodiments of the present disclosure.
Figure 4C:
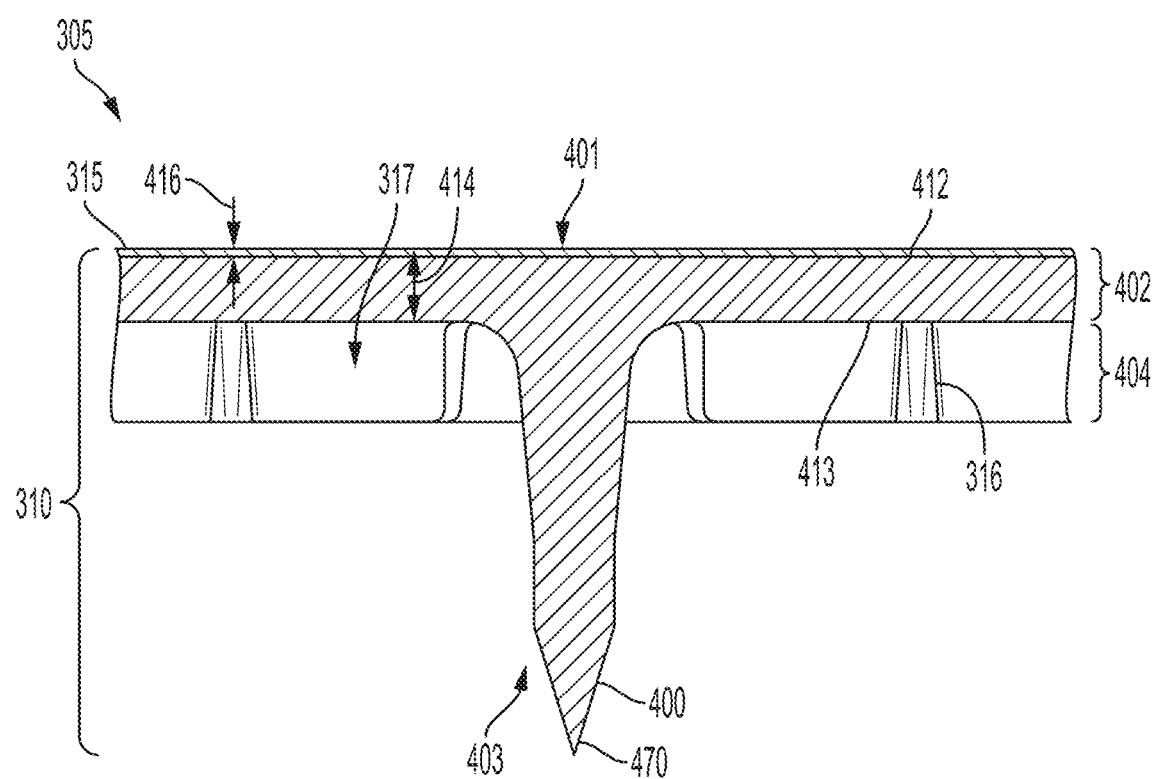
FIG. 4C is a cross-sectional view of a portion of the radome assembly of the antenna assembly of FIGS. 2A and 2B including an outer layer as well as a radome body assembly having a radome body portion, a radome spacer portion, and an elongated member in accordance with embodiments of the present disclosure.

Referring to FIGS. 4A, 4B, and 4C, various additional features of the radome assembly 305 are shown. As seen in FIG. 4C, the radome assembly 305 may include an inner end or portion 403 that is located nearest the lower enclosure 204 when the antenna apparatus 200 is fully assembled (e.g., see exploded view in FIG. 3B) and an outer end 401 located opposite the inner end 403. As shown, the radome assembly 305 includes a radome body assembly 310 (which may extend to the inner end 403) and an outer layer 315 (which may be located at the outer end 401). In some embodiments, the radome body assembly 310 and the outer layer 315 may be referred to as a radome. The outer layer 315 may be exposed to the elements when the antenna apparatus 200 is fully installed and, thus, the outer layer 315 may include water or other weatherproofing features, as described in more detail below.

The radome assembly 305 is designed to be an outer portion of the antenna apparatus 200, which is exposed to the outdoor environment and has mechanical properties of good strength to weight ratios, and a high modulus of elasticity for stiffness and resistance to deformation. Where referred to herein, discussion of the radome assembly 305 may refer to any one or more component of the radome assembly such as at least one of an outer layer 315, a radome body portion 402, a radome spacer portion 404, elongated members 400, and the like. So as not to impede RF signals, the radome assembly 305 has electrical properties of a low dielectric constant, and a low loss tangent. In addition, in some embodiments, the radome assembly 305 has chemical properties, for example, of bondability for bonding with adhesive, UV resistance, and low or near zero water absorption. The radome lay-up can also have other suitable properties to mitigate vulnerability to constant outdoor exposure and extreme weather conditions.

The radome assembly 305 is designed to maintain high mechanical values and electrical insulating qualities in both dry and humid conditions over thermal cycles between −40 degrees Celsius (° C.) and 85° C. In some embodiments, the radome assembly 305 has a relatively high yield strength and a relatively high enough modulus to spread load on various portions of the radome assembly 305. In some embodiments of the present disclosure, the radome assembly 305 has a dielectric constant of less than 4. In some embodiments of the present disclosure, the radome assembly 305 has a loss tangent of less than 0.001.

The radome body assembly 310 may include multiple portions, or components, which may be formed integrally or monolithically (e.g., from a same piece of material or collection of base materials and formed together) or, in various embodiments, may be formed separately and coupled together in any known manner. For example, the radome body assembly 310 may include any one or more of elongated members 400, a radome body portion 402, and a radome spacer portion 404. As will be described in further detail below, the elongated members 400 may be used to couple the radome assembly 305 to additional layers of the antenna apparatus 200. For example, a distal end 470 of the elongated members 400 (i.e., located at the inner end 403) may extend through some or all layers of the antenna stack assembly 250 (see FIG. 3B) and may be deformed or otherwise manipulated to resist separation of the various layers after assembly (e.g., see assembly of the antenna stack assembly 250 in FIG. 10).

In some embodiments of the present disclosure, the radome body assembly 310 may be constructed of a fiberglass base for mechanical strength. The fiberglass may be laminated with a polymer or copolymer of polyethylene, which may be functionalized with fluorine and/or chlorine. The laminate may be a fluorinated polymer (fluoro polymer), such as polytetrafluoroethylene (PTFE) or a copolymer of ethylene and chlorotrifluoroethylene, such as ethylene chlorotrifluoroethylene (ECTFE). The radome 232 may be fiberglass-reinforced epoxy laminate material, such as FR-4 or NEMA grade FR-4. In other embodiments, the radome body assembly 310 may be another type of high-pressure thermoset plastic laminate grade, or a composite, such as fiberglass composite, quartz glass composite, Kevlar composite, or a panel material, such as polycarbonate. As described in greater detail below, the radome assembly 305 may include a top hydrophobic surface for water removal.

In some embodiments of the present disclosure, the radome body assembly 310 may be a lay-up made from a first layer made from fibrous material, such as fiberglass or Kevlar fibers, pre-impregnated with a resin, such as an epoxy or polyethylene terephthalate (PET) resin.

In some embodiments, the radome body assembly may be formed from a plastic with a plurality of fibers located throughout. For example, the fibers may include fiberglass, Kevlar fibers, carbon fibers, or the like.

The radome body assembly 310 may also include a radome body portion 402. The radome body portion 402 may include a planar surface that extends across an entire width 408 and length 410 of the radome body assembly 310. The radome body portion 402 may have a rectangular shape, or may include any other shape such as circular, elliptical, square, or the like. The radome body portion 402 may provide structural support to the outer layer 315, may at least partially protect additional elements of the antenna stack 250 (see FIG. 3B) from elements in an environment of the antenna apparatus 200, and may be formed from a material through which antenna signals may travel (i.e., the radome body portion 402 may fail to interfere with antenna signals). The radome body portion 402 may have a planar top surface 412 and a uniform thickness 414 throughout. However, in various embodiments, the radome body portion 402 may have a curved top surface 412, may have a non-uniform thickness, or the like.

The thickness 414 of the radome body portion 402 may be in the range of less than or equal to 60 thousandths of an inch (mil, 1.5 millimeters (mm)), less than or equal to 30 mil (0.76 mm), less than or equal to 20 mil (0.51 mm), or less than or equal to 10 mil (0.25 mm). The thickness may depend on the conditions of the environment in which the antenna apparatus 100 resides, for example, with a greater thickness 414 being used in geographic locations having harsh weather conditions, such as heavy rain and hail. However, a reduced thickness 414 may reduce radio frequency (RF) signal attenuation from the antenna array. In one embodiment, the radome body portion 402 has a thickness of 0.5 mm.

In some embodiments, the radome body portion 402 and the outer layer 315 may be referred to as a radome. In some embodiments, the radome body portion 402 and the outer layer 315 (or the radome body assembly 310 and the outer layer 315) may be formed integral or monolithic and be formed from the same material. In other embodiments, the radome body portion 402 and the outer layer 315 (or the radome body assembly 310 and the outer layer 315) may be formed separately and assembled together.

The radome body assembly 310 may also include a radome spacer portion 404. The radome spacer portion may be made from the same or different material as the radome body portion 402 and may support the radome assembly 305 in providing mechanical and environmental protection to the antenna aperture 208 and other components of the antenna apparatus 200. The radome spacer portion 404 may also provide suitable spacing between the antenna elements of the antenna aperture 208 and the outer layer 315 of the radome assembly 305. As described in greater detail below, such spacing can provide advantages in reduced signal attenuation due to environmental effects on the outer top surface of the radome body portion 402, such as dirt, dust, moisture, rain, and/or snow.

In some embodiments, the radome spacer portion 404 is a plastic or foam layer having properties of low dielectric constant, low loss tangent, good compression strength, and a suitable coefficient of thermal expansion (CTE). In addition, the radome spacer portion 404 may have the property of bondability for bonding with adhesive for coupling with other layers in the antenna stack assembly 250.

As part of the radome assembly 305, the radome spacer portion 404 may also be designed to maintain high mechanical values and electrical insulating qualities in both dry and humid conditions over thermal cycling between −40° C. and 85° C. In some embodiments of the present disclosure, the radome spacer portion 404 has a dielectric constant of less than 1.0. In some embodiments of the present disclosure, the radome spacer portion 404 has a loss tangent of less than 0.001.

The radome body portion 402 may be adjacent or coupled to a radome spacer portion 404 to space the outer top surface of the radome body portion 402 from components of the antenna stack 250. In some embodiments, the radome body portion 402 may be formed monolithically with the radome spacer portion 404, or coupled to the radome spacer portion 404, for example, by adhesive bonding. As mentioned above, the radome body portion 402 and radome spacer portion 404 may together (alone or in combination with elongated members 400) be referred to as a radome body assembly 310. The radome spacer portion 404 may also have a planar and rectangular shape corresponding to that of the radome body portion 402.

As seen in FIG. 4C and in some embodiments, the radome spacer portion 404 may be thicker than the radome body portion 402. In accordance with embodiments of the present disclosure, the radome spacer portion 404 has a thickness such that the distance from the top patch antenna layer to the top of the radome in the range of greater than about 3.0 mm, less than about 4.5 mm, or in the range of 3.0 mm to 4.5 mm.

The radome spacer portion 404 may include a spacing configuration to space the radome body portion 402 from the antenna aperture 208 with air. As one non-limiting example, the radome spacer portion 404 may be made from foam material having air disposed within the structure of the foam. Foam spacers may be advantageous materials in some environments because of their lower dielectric constant and lower thermal conductivity. For example, in cold environments (such as cold climates or for antenna apparatuses 200 disposed on airplanes) foam spacers may provide an insulative effect for electrical components). One suitable foam may be a polymethacrylimide (PMI) or a urethane foam. However, other foams are within the scope of the present disclosure. Foams, unlike other materials described herein having thermal conductivity, may require separate heating systems for snow melt.

In other embodiments, the radome spacer portion 404 may be a frame structure. In one suitable embodiment, the frame structure may be designed to have air spaces within the structure of the plastic. One suitable frame structure may be a honeycomb structure. A suitable honeycomb structure may be made from a low-loss plastic material (such as thermoplastic or another suitable plastic material), which may be configured in a honeycomb frame construction.

In some embodiments, the radome spacer portion 404 may be air.

In some embodiments, the radome spacer portion 404 may include an interior portion 327 and an exterior portion 328 (see FIGS. 4A and 4B). In the illustrated embodiment, the interior portion 327 includes a plurality of cell walls 316, or cell portions 316, defining a plurality of apertures 315. The exterior portion 328 may extend around at least a portion of the outer perimeter of the interior portion 327, and may be a solid portion to assist in heat transfer around the outer perimeter of the antenna apparatus 200. In some embodiments, the exterior portion 328 may not be present. That is, inclusion of the exterior portion 328 may be optional.

Each of the plurality of cell walls 316 may extend away from the radome body portion 402. As seen in FIG. 4C, the radome body portion 402 may have a first surface 412, or top surface, defining a planar surface at or near the outer end 401 of the radome body assembly 310 and a second surface 316, or bottom surface, opposite the first surface such that each of the plurality of cell walls 316 extends away from the second surface (and towards the inner end 403 of the radome body assembly 310). Each of the plurality of cell walls 316 may include an opening at the top (near the second surface 316 of the radome body assembly 310), an opening at the bottom (extending toward the inner end 403 of the radome body assembly 310), and a vertical pathway therebetween defining an aperture 315. Each aperture 315 is configured to vertically align with an individual antenna element in the antenna array to provide an airspace above each upper patch element of each antenna element in the antenna array.

A group of cell walls 316 and a single aperture 315 within the plurality of cell walls may together form a cell. In that regard, each cell in the embodiment shown in FIGS. 4A-4C may include 6 cell walls 316 and a single aperture 315 (e.g., a single cell 450 shown in FIG. 4B may include cell walls 451a-451f and a single aperture 452). In some embodiments, at least a portion of the cell walls 316 may at least partially define an adjacent aperture 315 of an adjacent cell. For example, the cell wall 451b may at least partially define a cell 456. One skilled in the art will realize that the cell walls 316 may have any shape (e.g., rounded, straight, angled, or combinations thereof), and that a cell may include any quantity of cell walls 316 (including a single cell wall 316 defining a single cell), without departing from the scope of the present disclosure.

In some embodiments, at least two cell walls 316 (or cell portions 316) defining a cell may be spaced apart from each other. For example, any two or more of the cell walls 451a-451f defining the cell 450 may be spaced from each other (e.g., cell wall 451a may be spaced apart from cell wall 451d). In some embodiments, any two or more adjacent cell walls 316 defining a cell may be spaced apart from each other. For example, the cell wall 451a may be spaced apart from adjacent cell wall 451b by a gap 453. Such spacing between cell walls 316 defining a cell may be referred to as a nodeless cell configuration.

As referenced above, cell walls 316 may have any shape. In such embodiments any two cell portions, or cell walls, 316 defining a cell may be spaced apart from each other. For example, if cell portions include two semicircular walls defining a cell then at least one intersection of the two semicircular walls may be spaced apart from each other. In that regard, each cell may have at least one gap defined by the walls that form the cell.

The cell walls 316 of the interior portion 327 radome spacer 310 may provide a greater proportion of air to mitigate any RF interference with antenna signals from the antenna array 308. In some embodiments, the volumetric ratio of air to solid surface area or the cell 315 of the radome spacer 310 is greater than about 50:50, or alternatively greater than about 65:45, or alternatively greater than about 75:25, or alternatively greater than about 80:20, or alternatively greater than about 85:15, or alternatively greater than about 90:10. Where used throughout in the present application, the term "about" refers to the referenced value plus or minus 10 percent of the referenced value.

As described above, the radome spacer portion 404 (or the entire radome body assembly 310) may be formed from a plastic or other polymer. For example, the radome spacer portion 404 (or entire radome body assembly 310) may include polypropylene (PP), polycarbonates, polybutylene terephthalate (PBT), polyphenylene ether (PPE), poly(p-phenylene oxide) (PPO), polystyrene (PS), polyethylene terephthalate (PET), polyvinyl chloride (PVC), liquid crystal polymer (LCP), other polymers, or mixtures thereof.

RADOME OUTER LAYER

The radome assembly 305 may include an outer layer 315. RF signal attenuation due to gain degradation can be significant as a result of rain or moisture accumulation on the outer end 401 of the radome assembly 305, and the outer layer 315 may assist in reducing or eliminating such concerns. Regarding rain and moisture accumulation, water has a significant relative permittivity which can introduce a non-trivial interface for an antenna aperture causing RF reflection. Such RF reflection results in gain degradation in the RF signal.

Snow accumulation on the outer end 401 of the radome assembly 305 was generally not found to be as degrading to the RF signal power as water accumulation. However, snow with any moisture content was found to be degrading, such as snow at or near 0° C., or melting snow or ice resulting in water accumulation on the on the outer end 401 of the radome assembly 305 was found to significantly degrade the RF signal power.

As described above, to mitigate signal attenuation due to the lingering presence of droplets of rain, the outer layer 315 (and the radome body portion 402) may be spaced a predetermined distance from the antenna aperture 208. In accordance with embodiments of the present disclosure, the radome spacer portion 404 provides a suitable thickness to space the outer surface 315 (and potentially the radome body portion 402) a predetermined distance from the upper patch layer of the antenna aperture 208. As described above, in one embodiment of the present disclosure, the outer surface 315 is equidistantly spaced from the upper patch antenna element of each individual antenna element in the antenna aperture at a distance of at least 3.0 mm.

For moisture mitigation and to aid in the run-off of water or moisture accumulating on the radome assembly 305, the outer layer 315 may include a hydrophobic or superhydrophobic material having low surface energy to cause water to bead up and not spread out. Non-limiting examples of materials usable for the outer layer 315 may include melt-processable or extrudable fluoropolymer materials. Such fluoropolymers can include, but are not limited to, ethylene tetrafluoroethylene (ETFE), fluorinated ethylene propylene (FEP), and perfluoroalkoxy alkane (PFA). Suitable fluoropolymers may also include a plasma treated ethylene chlorotrifluoroethylene (ECTFE), with plasma treatment to replace chlorines with fluorines to make the ECTFE surface behave more like an ETFE surface.

Suitable fluoropolymers may be melt-processable extruded into the desired formation. Such extrudable materials can result in simplified processing. Furthermore, such extrudable fluoropolymers can be easier to bond to layers and to integrate additives.

ETFE, ECTFE, and potentially other melt-processable fluoropolymers tend be easier to activate, for example, by plasma treatment because the surface is not fully fluorinated. In addition, ETFE and other melt-processable fluoropolymers have lower melt temperatures than PTFE which makes it easier to incorporate solid UV blockers, such as TiO2, into the plastic layer.

In some embodiments, the melt-processable fluoropolymer layer may include titanium dioxide doping at up to 10% for UV protection.

Water Contact Angle

The material of the radome assembly can affect performance of the antenna assembly. For example, as rain, snow, or other elements gather on the surface of the radome assembly, the quality of the signal sent and received by the antenna assembly can be reduced. Specifically, the water contact angle between the radome material and water droplets can affect the signal-to-noise ratio or the signal attenuation of the antenna assembly. The smaller the contact angle or the surface tension is, the larger the wetting tendency. Therefore, with a larger contact angle, the water tends to bead up, reducing signal attenuation. Previously designed radome structures have been made using a polytetrafluoroethylene (PTFE) material; the water contact angle of PTFE is about 120 degrees. A radome structure generated with an ethylene tetrafluoroethylene (ETFE) as described herein can have a similar water contact angle of about 105 degrees. Both of these contact angles allow for sufficient water beading and signal attenuation. Suitable radome assembly materials in accordance with embodiments of the present disclosure have a water contact angle of greater than 90 degrees.

Example 1: Performance in Rain

Figure 5A:
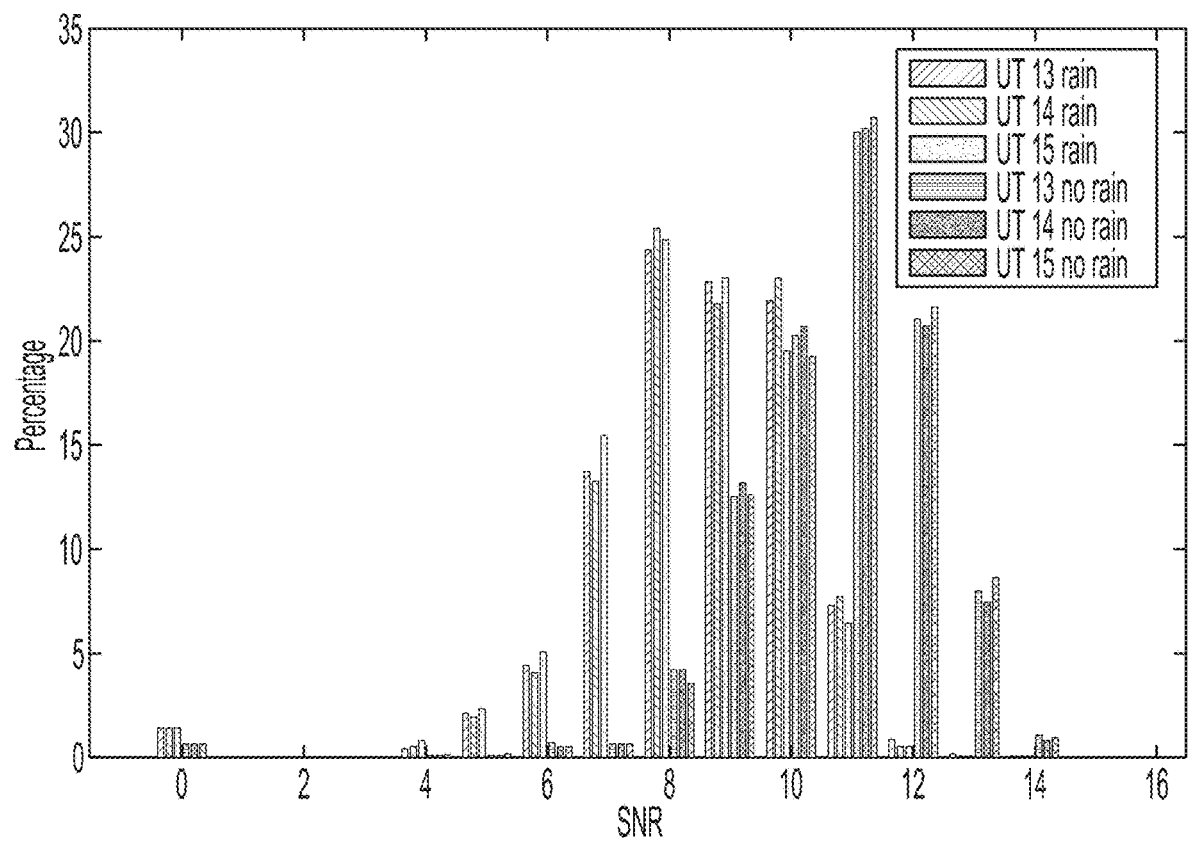
FIGS. 5A-5C are graphical representations illustrating changes in signal-to-noise ratio over a period of time for antenna assemblies having radomes designed in accordance with embodiments of the present disclosure.
Figure 5B:
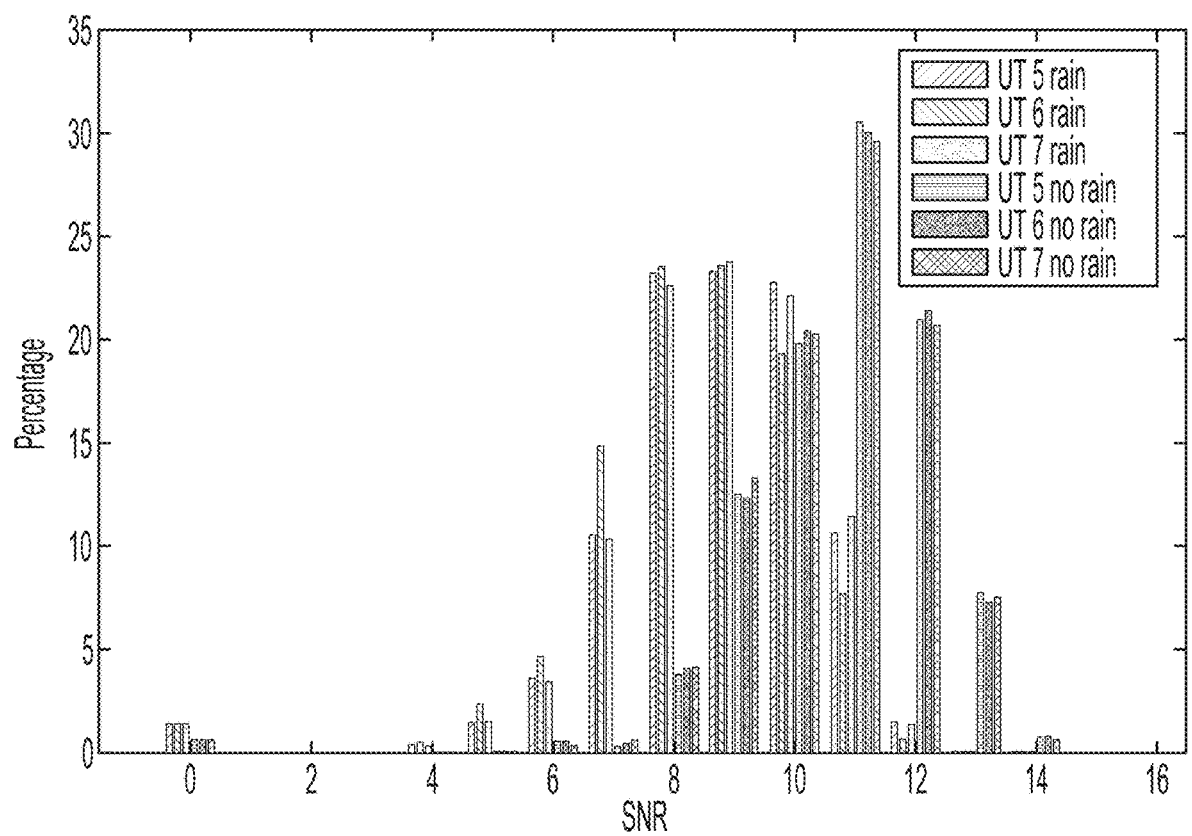

Various tests were performed to determine the effect of an ETFE radome assembly on the SNR of signals sent from the antenna assembly. The results of such tests are provided in FIGS. 5A-5C. Specifically, FIG. 5A illustrates the change in SNR over a period of time using a radome assembly made of ETFE (UT13-UT15) with and without rain. In comparison, FIG. 5B illustrates the results obtained for the same tests performed using a radome made of PTFE (UT5-UT7). Data corresponding to that illustrated in the graphs of FIGS. 5A and 5B are provided in Tables 1 and 2, below.

TABLE 1

|  | UT5 | UT6 | UT7 | UT13 | UT14 | UT15 |
|---|---|---|---|---|---|---|
| 'no rain SNR avg' | 11.12 | 11.10 | 11.07 | 11.12 | 11.08 | 11.16 |
| 'no rain SNR std' | 1.86 | 1.88 | 1.85 | 1.83 | 1.84 | 1.83 |
| 'rain SNR avg' | 9.18 | 8.89 | 9.19 | 8.97 | 8.99 | 8.83 |
| 'rain SNR std' | 1.96 | 1.97 | 1.98 | 1.84 | 1.86 | 1.90 |
| 'SNR avg diff' | 1.95 | 2.21 | 1.88 | 2.15 | 2.09 | 2.33 |

TABLE 2

|  | PTFE | ETFE |
|---|---|---|
| 'avg SNR diff' | 2.013 | 2.190 |
| 'avg SNR std' | 0.178 | 0.126 |
| 'ETFE-PTFE SNR diff' | 0.177 | |

The results show that an antenna assembly having a radome outer layer made from ETFE provided the same or similar SNR values as an antenna assembly having a radome outer surface made from PTFE. In addition, over time and as rain water accumulated to a certain amount on the radome surface, the performance of the antenna assembly having a radome outer layer made from ETFE improved compared to the antenna assembly having a radome outer surface made from PTFE.

While not wishing to be bound by theory, it is hypothesized by the inventors that, while the water contact angle of PTFE is higher than that of ETFE, the water slide angle of ETFE is lower than that of PTFE. Therefore, initial performance of the antenna assembly having a radome outer surface made from PTFE is improved over the antenna assembly having a radome outer layer made from ETFE. However, over time and as rain water accumulates to a certain amount on the radome surface, the performance of the antenna assembly having a radome outer layer made from ETFE improves to be more advantageous than the performance of the antenna assembly having a radome outer surface made from PTFE. Such improvement is thought to be attributed to a more advantageous (e.g., lower) slide angle of ETFE compared to PTFE when oriented at an incline to allow water at a certain level of accumulation to slide off the surface more easily. In one suitable orientation, the radome surface of the antenna assembly may be tilted at 22 degrees from horizontal. Other tilt angles are also contemplated within the scope of the present disclosure.

Therefore, the data in FIGS. 5A and 5B shows the performance of a radome having an outer layer of ETFE is close to, if not better than, the performance of a PTFE radome after a certain period of time for rain accumulation.

Example 2: Self Cleaning

Figure 5C:
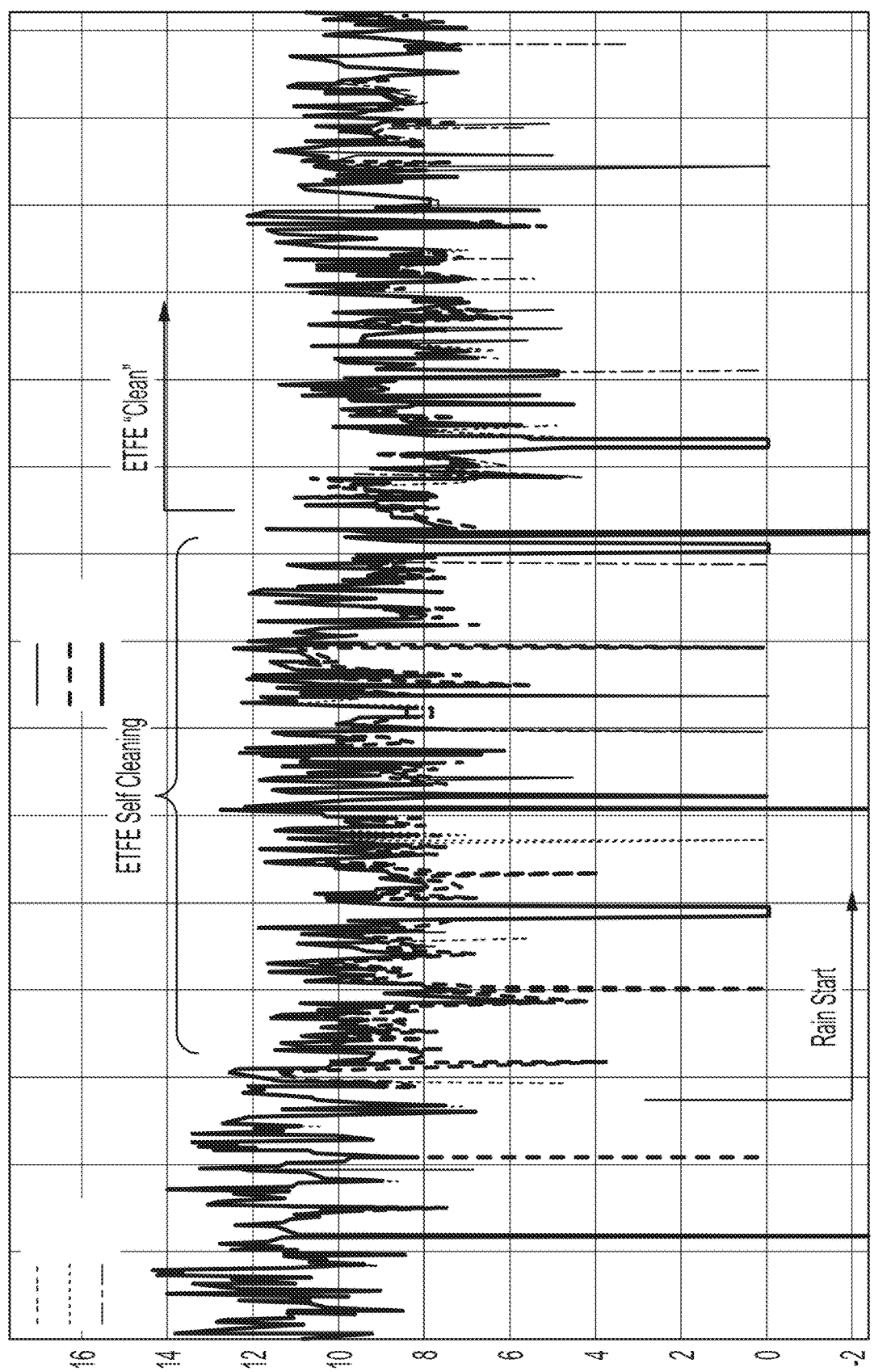

FIG. 5C is a graph illustrating the evidence of slip and soil cleaning. The data shows that for an antenna assembly having a radome with an outer layer of ETFE is able to self-clean after a period of time to become hydrophobic again.

Example 3: UV Light Stability

Additional tests were performed to determine the stability of ETFE radome material in view of ultraviolet light exposure and humidity. Additionally, dark light cycles were used to simulate wear on ETFE radome outer layer samples. The ETFE radome outer layer samples were evaluated to determine the extent of damage or deterioration which occurred. In one test, the contact angle of ECTFE decreased after UV exposure at a first angle. In contrast, the contact angle of ETFE appeared to remain more stable after UV exposure from a second, different angle. In some embodiments of the present disclosure, ECTFE may be plasma treated to replace chlorine with fluorine to make ECTFE behave more like an ETFE surface with enhanced UV stability.

In addition to a hydrophobic or superhydrophobic outer layer 315, tilting of the antenna apparatus 200 (see FIG. 2A) may help to mitigate snow and moisture accumulation.

In accordance with one method of manufacturing, a melt-processable fluoropolymer in accordance with embodiments of the present disclosure is extruded into a thin sheet. The thin sheet is then activated on one surface for bonding with an adhesive, such as a pressure sensitive adhesive. Suitable activation may include sodium etching, plasma treatment, corona treatment, or other suitable activation treatments to create bonding sites. The fluoropolymer and adhesive lay-up can be routed into a desired shape. In some embodiments, the outer layer 315 may be formed to include a UV blocker, which may protect the adhesive (e.g., the pressure sensitive adhesive). In some embodiments, the radome body assembly 310 may include a UV blocker in the form of pigmentation.

In some embodiments, the outer layer 315 may be formed by melting the material and adding it to the radome body assembly 310, may be molded (e.g., insert molding), painted, sprayed, and the like.

In previously developed technology, a PTFE material was used to form the entirety of the radome (for example, outer surface 315 and radome body portion 402). However, it has been determined by the inventors that PTFE (and other fluoropolymers) tend to have manufacturing drawbacks when used in the radome body portion 402. For example, because PTFE is not melt-processable, it is skifed into sheets or sintered to fiberglass cloth for form sheet products. Both of these processes are more difficult manufacturing processes than extruding a plastic layer, resulting in reduced quality control.

Despite the drawbacks discussed above, in some embodiments, the outer layer 315 and the radome body portion 402 may be formed monolithically out of the same melt-processable fluoropolymer. In that regard, the radome body portion 402 and the outer layer 315 may include the same melt-processable fluoropolymer.

When formed separately, the outer layer 315 may be coupled to the radome body assembly 310 using any known technique. For example, as discussed above, the outer layer 315 may be bonded to the radome body assembly 310 using an adhesive. The adhesive may include any adhesive such as a pressure sensitive adhesive (PSA) applied to a surface of the outer layer 315. In that regard, the PSA may be placed in contact with the outer layer 315 and the radome body portion 402 and pressure may be applied to the outer layer 315 to couple the outer layer 315 to the radome body assembly 310. In some embodiments, the adhesive may include an epoxy, heat activated adhesive, or any other adhesive in the art.

In some embodiments, the outer layer 315 may be formed to have greater dimensions (e.g., length and width) than those of the radome body portion 402. In such embodiments, the outer layer 315 may be applied to the radome body portion 402 and then cut (e.g., die cut) to have the same dimensions as the radome body portion 402.

In some embodiments, the outer layer 315 may be applied to the radome body assembly 310 using a spray or roll-on technique (e.g., by spraying or rolling on a liquid or gaseous phase of the outer layer material). In some embodiments, a melted fluoropolymer may be applied to the radome body assembly 310 and allowed to dry-harden in place.

In some embodiments, the outer layer 315 may have a thickness 416 that is less than or equal to 20 mil (0.51 mm), less than or equal to 10 mil (0.25 mm), less than or equal to 5 mil (0.13 mm), less than or equal to 3 mil (0.076 mm), less than or equal to 1 mil (0.025 mm), or the like.

Antenna Layers

FIG. 3B illustrates an exemplary antenna apparatus 200 with an exemplary antenna stack assembly 250 in the form of a plurality or stack of layers. The illustrated plurality of layers includes layers of spacers or spacer portions positioned against other layers including antenna layers or layers including antenna elements or components, which may be for instance electronic layers, such as printed circuit board (PCB) layers.

In the illustrated embodiment of FIG. 3B, the layers in the antenna stack assembly 250 layup include a radome assembly 305, a patch antenna assembly 334, a dielectric layer 375, and a printed circuit board (PCB) assembly 380.

As illustrated in FIG. 3B, an outer top layer of the antenna stack assembly 250 includes an outer layer 315 of the radome assembly 305. As described above, in the illustrated embodiment, the radome assembly 305 is a radome assembly including a radome body assembly 310 and an outer layer 305.

Figure 6A:
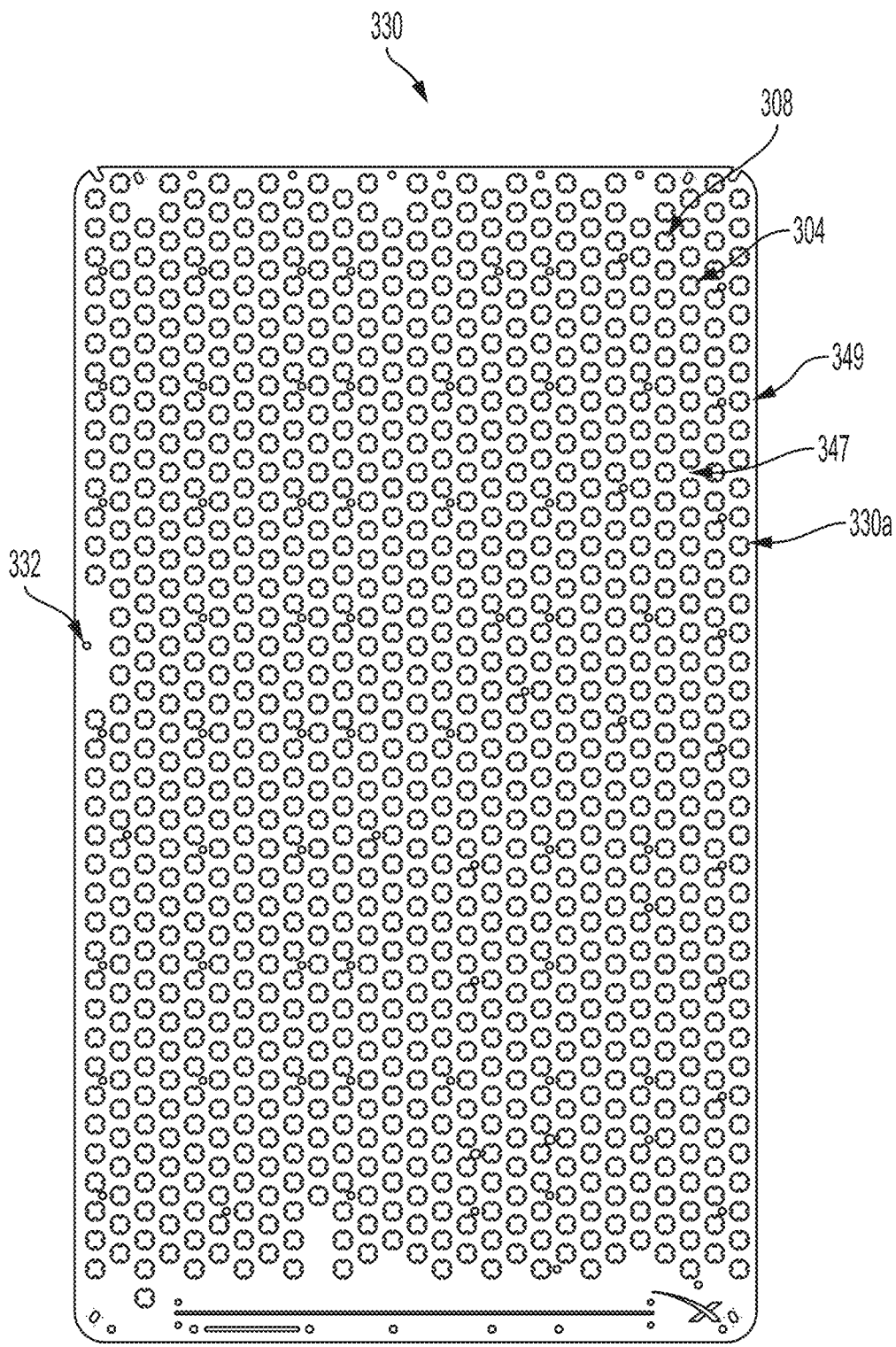
FIG. 6A is a top view of an upper patch antenna layer of the antenna assembly of FIGS. 2A and 2B showing an array of upper patch antenna elements in accordance with embodiments of the present disclosure.

In the illustrated embodiment of FIG. 3B, a patch antenna assembly 334 is a phased array antenna assembly made up from a plurality of individual patch antenna elements 304 (see FIGS. 7A and 7B) configured in an array 308 (see FIG. 6A for a top view of an array of upper patch antenna elements 330a). A patch antenna is generally a low profile antenna that can be mounted on a flat surface, including a first flat sheet (or "first patch") of metal mounted over, but spaced from, a second flat sheet (or "second patch") of metal, the second patch defining a ground plane. The two metal patches together form a resonant structure. The individual patches may be formed using known metal deposition techniques on a standard PCB layer or other suitable substrate. In an alternate embodiment, the patches may be printed, for example, using a conductive ink, on the patch layers. An array of multiple patch antennas on the same substrate can be used to make a high gain array antenna or phased array antenna for which the antenna beam can be electronically steered.

Figure 7A:
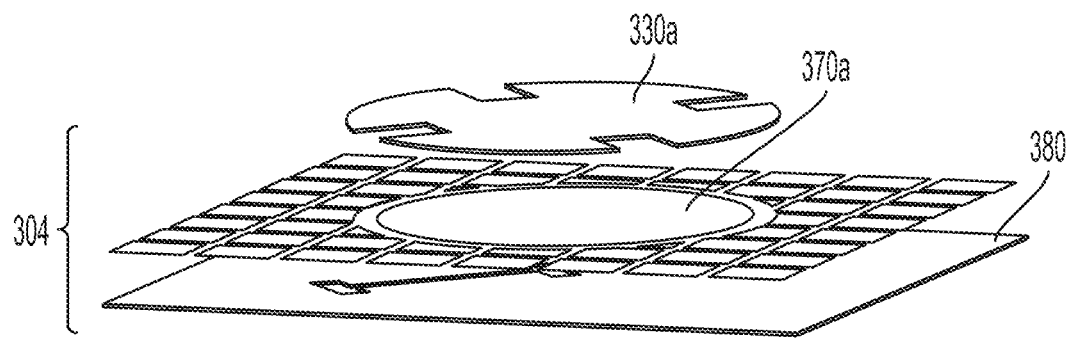
FIGS. 7A and 7B are isometric views of a single antenna element in an antenna element array of the antenna assembly of FIGS. 2A and 2B in accordance with embodiments of the present disclosure.

FIG. 7A illustrates a perspective view of a simplified exemplary individual antenna element 304 including an upper patch layer 330a, a lower patch layer 370a, and spacing therebetween. The individual element shown FIG. 7A is one of a plurality of antenna elements forming an array of antenna elements (see FIG. 6A).

Figure 6B:
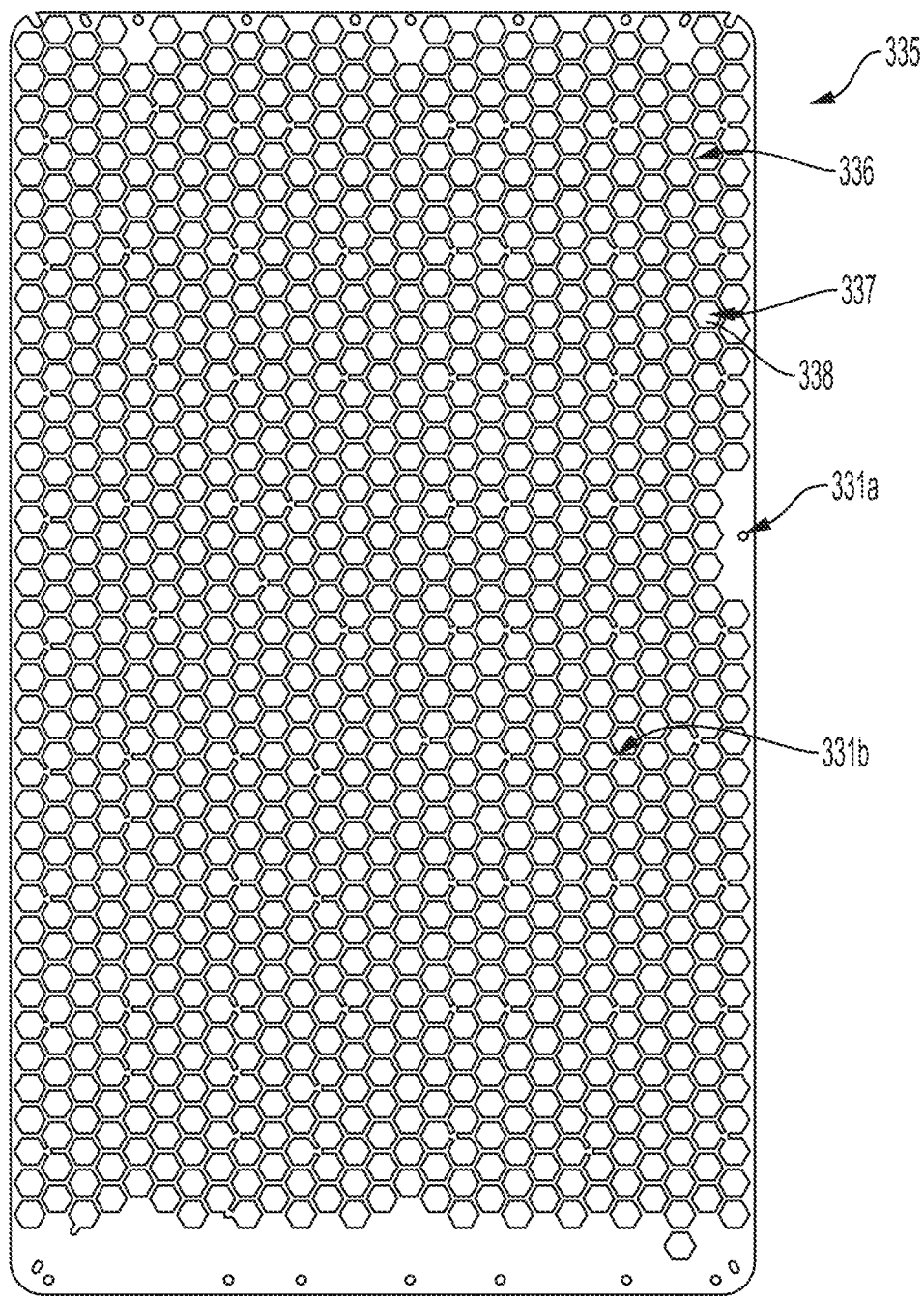
FIG. 6B is a top view illustrating an antenna spacer of the antenna assembly of FIGS. 2A and 2B in accordance with embodiments of the present disclosure.
Figure 6C:
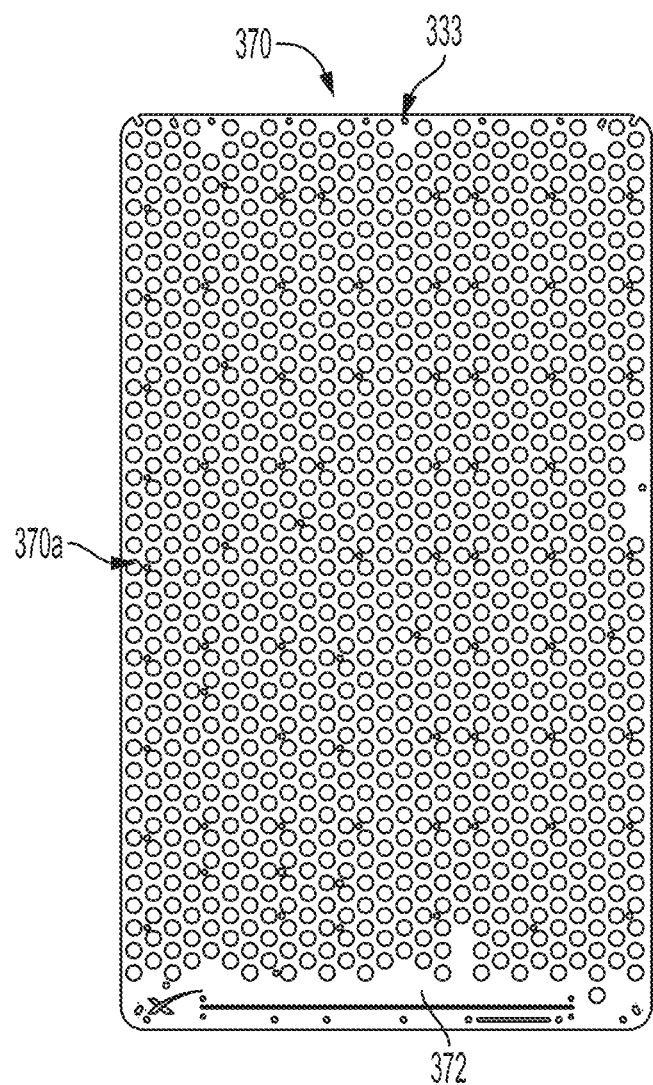
FIG. 6C is a top view of a lower patch antenna layer of the of the antenna assembly of FIGS. 2A and 2B showing an array of lower patch antenna elements in accordance with embodiments of the present disclosure.

In the illustrated embodiment, the array 308 of individual patch antenna elements 304 is formed from a plurality of patch antenna layers, including the upper patch antenna layer 330 (see also FIG. 6A), the antenna spacer 335 (see FIG. 6B), and the lower patch antenna layer (or ground plane) 370 (see FIG. 6C). As mentioned above, the upper antenna patch layer 330 and the lower patch antenna layer 370 may be formed on standard PCB layers or other suitable substrates. The two layers 330 and 370 are suitably spaced from each other specific by the antenna spacer 335 to achieve the desired tuning of the patch antenna assembly 334. While a two-patch (upper and lower patch) antenna is illustrated herein, other single or multilayer patch antennas may be employed in accordance with embodiments of the present disclosure.

As seen in FIG. 3B, below the radome assembly 305 is positioned adjacent the upper patch layer 330 to protect the upper surface of the upper patch layer 330. FIG. 6A illustrates a top view of the upper patch layer 330. As seen in FIG. 6A, the upper surface of the upper patch antenna layer 330 includes an interior portion 347 having a plurality of individual upper antenna patch elements 330a that make up the upper patches of individual antenna elements 304 defining the antenna array 308. The upper antenna patch elements 330a may be a plurality of discrete individual dots, circles, modified circles, or other polygonal shapes made up of a conductive metal such as copper. The upper antenna patch elements 330a may be separated from each other on the upper patch layer 330 by non-conductive portions of the upper patch antenna layer 330 between the upper antenna patch elements 330a.

The upper patch antenna layer 330 further includes an exterior portion 349 extending to its perimeter. The exterior portion 349 may be relatively small (i.e., may include a relatively small fraction of the entire surface area of the upper patch antenna layer 330 such as 1 percent, 3 percent, 5 percent, 10 percent, or the like), or may fail to exist. The exterior portion 329 may port or flow thermal energy (heat) radially from the overall antenna stack assembly 250 outward to the perimeter of the upper patch layer 330 and to the perimeter of the radome assembly 305. The upper patch layer 330 may define ports 332 through which the elongated members 400 of the radome body assembly 310 (see FIG. 4C) may pass. The ports 332 may be located between upper patch antenna elements 330a so as to not interfere with any antenna elements of the antenna array. The ports 332 may be formed during molding or other formation of the upper patch antenna layer 330, may be cut or drilled into a pre-formed upper patch antenna layer 330, or the like. The elongated members 400 of the radome body assembly 310 engage the PCB assembly 380 (see FIG. 10). The upper patch antenna layer 330 may also port or flow heat to the ports 332 where the elongated members 400 port the heat to the radome body assembly 310, which can be used to not only dissipate unwanted heat from electrical components attached to the PCB assembly 380, but also such heat can be repurposed to mitigate snow and rain accumulation on the outer surface 315 of the radome assembly 305.

In some embodiments, the upper patch antenna layer 330 is a PCB substrate having a plurality of upper antenna patch elements 330a. The features of the upper patch antenna layer 330 may be formed by suitable semiconductor processing to obtain the desired feature patterns and shapes.

Turning to FIGS. 3B and 6B, the lower patch antenna layer 370 may be spaced from the upper patch antenna layer 330 by an antenna spacer 335. The antenna spacer 335 may include a plurality of cell walls 336 that define a plurality of open cells 337. The antenna spacer 335 may also define a plurality of ports 331a extending therethrough. The ports 331a may be aligned with ports defined by other layers of the antenna stack 250 and with the elongated members 400 of the radome body assembly 310. In that regard, the elongated members 400 may extend through the ports 331 to couple the layers of the antenna stack 250 together (see FIG. 10). Because the antenna spacer 335 includes only cell walls 336 in an interior portion of the antenna spacer 335, ports 331b may be defined at junctions of cell walls 336. That is, certain cell walls 336 may not intersect with adjacent cell walls to form the ports 331b. The ports 331a and 331b may be formed during molding or other formation process of the antenna spacer 335, may be cut or drilled into a pre-formed antenna spacer 335, or the like.

Each of the plurality of cell walls 336 may extend substantially parallel to a stacking axis of the antenna stack assembly 250. The cells 337 may have a similar shape as the cells 315 defined by the cell walls 316 of the radome spacer portion 404. In some embodiments, the cells 337 may have a different shape such as circular, oval, square, or any other shape. Each of the cells may align with an antenna element 304. The cells 337 may each define a vertical pathway 338 extending along an entire thickness of the antenna spacer 335. That is, the pathway 338 may include a void extending through from a first side to a second side of the antenna spacer 335 such that the antenna spacer 335 lacks any material directly aligned with the antenna elements 304 along the stacking axis.

A group of cell walls 336 and a single pathway 338 within the plurality of cell walls may together form a cell 337. In that regard, each cell 337 may include 6 cell walls 336 and a single pathway 338. In some embodiments, at least a portion of the cell walls 336 may at least partially define an adjacent pathway 338 of an adjacent cell 337. One skilled in the art will realize that the cell walls 336 may have any shape (e.g., rounded, straight, angled, or combinations thereof), and that a cell 337 may include any quantity of cell walls 336 (including a single cell wall 336 defining a single cell), without departing from the scope of the present disclosure.

The cell height of the antenna spacer 335 may be in the range of 1 mm to 2 mm (e.g., about 1.2 mm). Likewise, the cell walls 336 of the antenna spacer 335 may be in the range of 1 mm to 2 mm wide (e.g., about 1.2 mm). Where used in this context, about refers to the referenced value plus or minus 10 percent of the referenced value.

A suitable plastic for the antenna spacer 335 may be thermally conductive and capable of dissipating heat through its structure, while also have a low dielectric constant. In one embodiment of the present disclosure, the antenna spacer 335 may be made from the same or similar materials as the radome body portion 310 and may have a dielectric constant of less than 3.0, and a thermal conductivity value of greater than 0.35 W/m-K or greater than 0.45 W/m-K.

The antenna spacer 335 may be made up of the same or similar materials and by similar manufacturing processes as the radome spacer 310. As seen in FIG. 6B, the antenna spacer 335 may have a honeycomb structure, similar to the radome spacer portion 404 or may be made from a suitable foam or other suitable spacing structure. Although illustrated and described as a single spacing layer, the antenna spacer 335 may be comprised of a plurality of spacer elements defining the space between the upper and lower patch layers 330 and 370 of the patch antenna assembly 334.

Referring to FIGS. 3B and 6C, the lower patch antenna layer 370 is spaced beneath the upper patch antenna layer 330. As shown, a top surface 372 of the lower patch antenna layer 370 includes a plurality of individual upper antenna patch elements 370a that make up the lower patches of individual antenna elements 304 defining the antenna array 308. Like the upper antenna patch elements 330a, the lower antenna patch elements 370a may be a plurality of discrete individual dots, circles, modified circles, or other polygonal shapes made up of a conductive metal such as copper. The lower antenna patch elements 370a may be separated from each other on the lower patch layer 370 by portions of the lower patch antenna layer 370 between the lower antenna patch elements 370a. In one embodiment, the lower patch antenna layer 370, like the upper patch antenna layer 330, is a PCB substrate having a plurality of upper antenna patch elements 370a.

The lower patch antenna layer 370 may also define ports 333 extending from the top surface 372 to a bottom surface 373. As with ports defined by other layers of the antenna stack 250, the elongated members 400 of the radome body assembly 310 may extend through the ports to couple the layers together (see FIG. 10). The ports 333 may be located between lower patch antenna elements 370a such that the elongated members 400 fail to interfere with operation of the various lower patch antenna elements. The ports 333 may be formed with the lower patch antenna layer 370 during molding or other formation of the lower patch antenna layer 370, may be cut or drilled into a pre-formed lower patch antenna layer 370, or the like.

As seen in FIGS. 7A, the individual lower patch layer elements 370a are configured to align with the individual upper patch antenna elements 330a, for example, in a vertical stack. The lower patch antenna elements 370a may be the same as or similar in shape and configuration as the upper patch antenna elements 330a. In the illustrated embodiment, the upper patch elements 330a are generally circular in configuration and include a plurality of slots for antenna polarization or tuning effects, while the lower patch antenna elements 370a are generally circular in configuration.

Figure 7B:
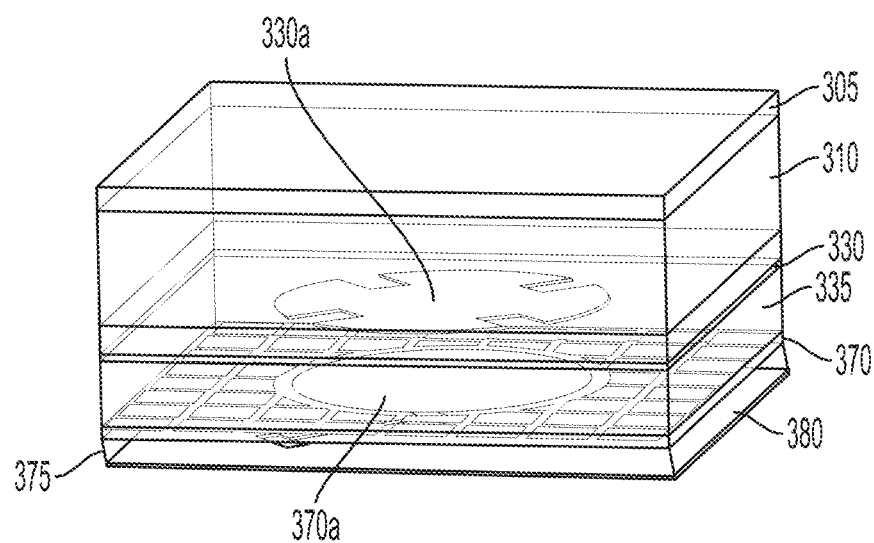

As seen in FIG. 7B, the upper patch antenna layer 330 is spaced by an antenna spacer 335 from the lower patch antenna layer 370. As described above, the antenna spacer 335 may be made up of the same or similar material as the radome spacer portion 404 (and, thus, may include the same material as the entire radome body assembly 310), and may also have a cell and wall structure similar to that of the radome spacer portion 404. Similar to the upper patch antenna elements 330a and the radome spacer portion 404, each of the plurality of apertures in the antenna spacer 335 may include a vertical pathway to align with each lower patch element 370a (at the bottom) and each upper patch antenna 330a (at the top) to define a plurality of individual antenna elements 304 in the antenna array 308.

Below the upper and lower antenna patch elements 330a and 370a is the PCB assembly 380, which includes circuitry that may be aligned with the upper and lower antenna patch elements 330a and 370a, which together may form a resonant antenna structure. The PCB assembly 380 is separated from the lower patch antenna 370 by a dielectric spacer 375.

Dielectric Spacer

Figure 8A:
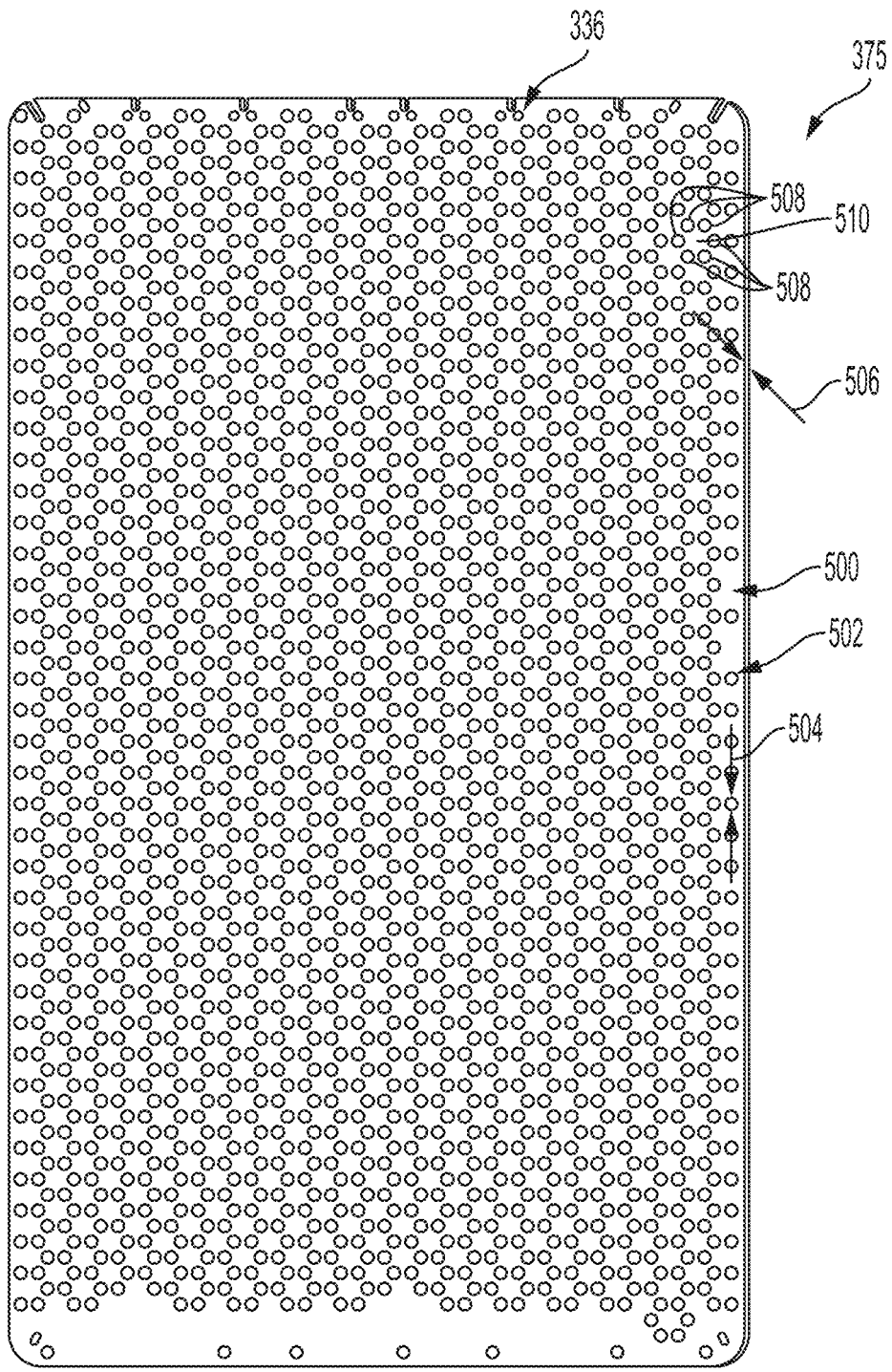
FIG. 8A is a top view of a dielectric spacer layer of the antenna assembly of FIGS. 2A and 2B illustrating exemplary locations and sizes of openings formed through the dielectric spacer layer in accordance with embodiments of the present disclosure.
Figure 8B:
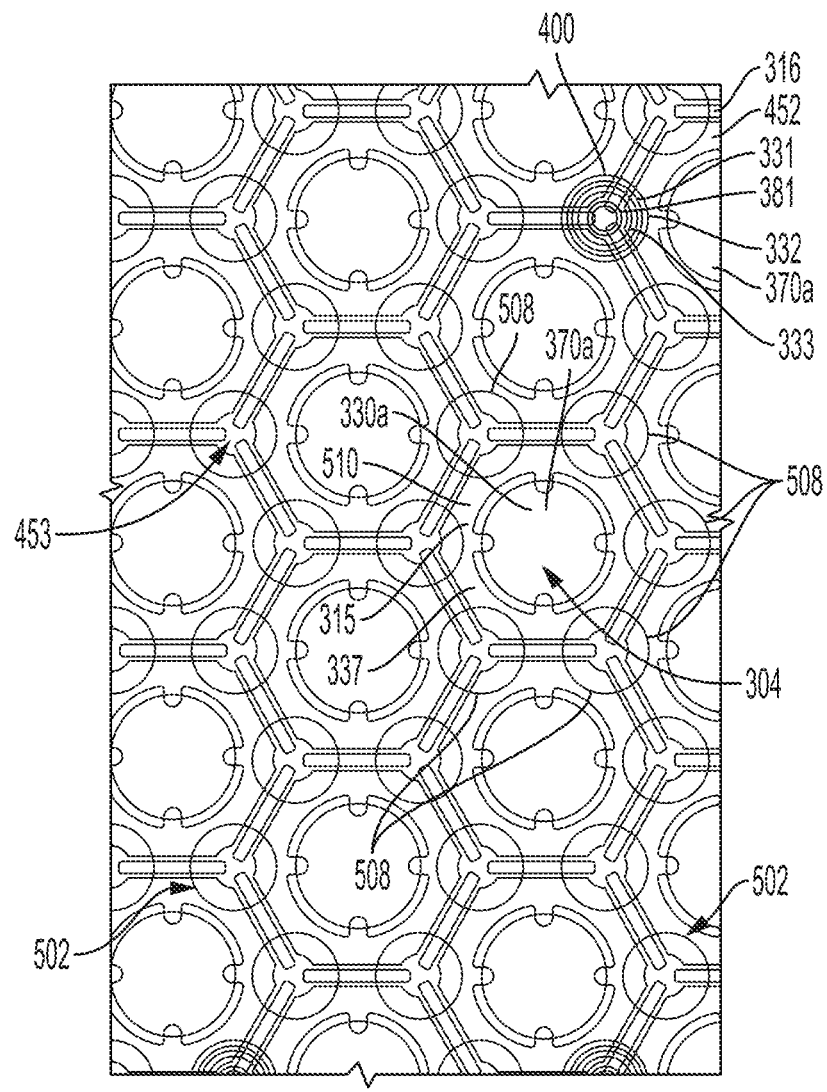
FIG. 8B is an enlarged top view of various elements of the antenna stack of the antenna assembly of FIGS. 2A and 2B illustrating relative locations of cell walls of a radome spacer portion, openings of a dielectric spacer layer, ports through which elongated members of a radome body assembly extend, and patch antenna elements in accordance with embodiments of the present disclosure.

Referring to FIGS. 3B, 8A, and 8B, a dielectric layer 375 provides an electrical insulator between the patch antenna assembly 334 and the PCB assembly 380 and spaces the patch antenna assembly 334 from the PCB assembly 380. The dielectric layer 375 may have a low dielectric constant (which may be referred to as relative permittivity), for instance in the range of about 1 to about 4 at room temperature.

In accordance with embodiments of the present disclosure, in addition to being an electrical insulator, the dielectric spacer 375 may be configured to be a fire enclosure for the antenna apparatus 200. In that regard, the dielectric spacer 375 may be manufactured to have flame retardant properties, for example, by inclusion of 5% decabromodiphenyl ethane (DBDPE) together with the dielectric materials of the dielectric spacer 375.

The dielectric spacer 375 may include a planar body formed from a dielectric material 500 with a plurality of holes 502 formed therethrough. The material 500 of the dielectric spacer 375 may include any dielectric material. For example, the dielectric spacer 375 may include a polymer, silicon, or any other material or materials.

The holes 502 formed in the dielectric spacer 375 may optimize a scan angle of the antenna apparatus 200 (because the antenna apparatus 200 is a phased array antenna, it is capable of scanning in multiple directions). For example, the combination of the material 500 and the holes 502 (including the shape, size, and location of the holes 502) may increase a scan angle (i.e., an angle at which a main beam may form relative to the stacking axis of the antenna stack 250) by at least 0.5 percent, by at least 1 percent, by at least 1.5 percent, by at least 2 percent, by at least 2.5 percent, by at least 3 percent, or the like. In experiments, the dielectric spacer 375 shown herein achieved improvements in scan angle of at least 2 percent.

The holes 502 may have any shape. For example, the holes 502 may be circular, oval, triangular, square, rectangular, or any other polygonal or other shape. The holes 502 may have a diameter 504. In some embodiments, the diameter 504 may be between 1 millimeter and 25 millimeters (40 mil and 984 mil), between 2 millimeters and 15 millimeters (80 mil and 591 mil), between 3 millimeters and 10 millimeters (120 mil and 400 mil), or about 5 millimeters (197 mil). Where used in this context, "about" refers to the referenced value plus or minus 10 percent of the referenced value.

In some embodiments, the holes 502 may be located around an individual antenna element 304 (i.e., around an individual upper patch antenna element 330a and lower patch antenna element 370a). That is, a group of holes 508 in the material 500 of the dielectric spacer 375 may encircle or surround a portion 510 of solid dielectric material 500. The holes 502 may surround portions 510 such that each portion 510 aligns with a different antenna element 304 such that solid dielectric material 500 is aligned with each antenna element 304 along the stacking axis (shown in detail in FIG. 8B). In some embodiments, the holes 502 may align with the gaps 453 between adjacent cell walls 316 of the radome spacer portion 404. This orientation of holes 502 aids in achieving the desired properties of the dielectric spacer 375 (i.e., the CTE value, the dielectric value and properties, the scan angle improvement, and the like).

As shown in FIG. 8B, each of the plurality of antenna elements 304 of the upper patch layer 330 align with each of the plurality of apertures 315 having the cell walls 316 of the radome spacer 310 and with openings of cells 337 defined by the antenna spacer 335. For example, each of the antenna elements 304 are disposed within the apertures 315 and the cells 337 of the antenna spacer 335 to provide suitable spacing around each of the antenna elements 304.

At least some of the holes 502 of the dielectric spacer 375 may align with the ports 331, 332, 333 of the upper patch antenna layer 330, the antenna spacer 335, and the lower patch antenna layer 370. In that regard, the elongated members 400 may extend through the at least one of each port 331, 332, 333 and at least one hole 502 to couple the layers of the antenna stack 250 together.

The material 500 of the dielectric layer 375 may have a thickness 506. The thickness 506 may be, for example, between 0.1 mm and 5 mm (3.9 mil and 197 mil), between 0.2 mm and 2 mm (7.9 mil and 79 mil), between 0.5 mm and 1 mm (20 mil and 39 mil), or about 0.7 mm (28 mil). These thicknesses 506 may aid in achieving the desired properties of the dielectric spacer 375.

In some embodiments, the dielectric spacer 375 may include any other shape of holes so long as material 500 is aligned with the antenna elements 304. In some embodiments, the dielectric spacer 375 may lack holes or openings. In some embodiments, holes or openings may be aligned with the antenna elements 330a, 370a along the stacking axis. In some embodiments, the dielectric spacer 375 may include pucks, disks, or other separated pieces of dielectric material that is aligned with the individual antenna elements 304. In some embodiments, a plurality of pucks, disks, or other pieces of dielectric material may be coupled together, e.g., via wires, strips of material, or the like, to form the dielectric spacer 375. The advantageous features of the dielectric spacer 375 may be achieved by using a dielectric material (e.g., of the composition described above) aligned with the individual antenna elements 304 along the stacking axis; and voids, or a lack of dielectric material, at other locations on the same plane as the dielectric material.

The combination of materials described above forming the dielectric material 500 along with the holes 502 (including the shape, size, and location thereof) may together achieve a desirable set of characteristics or parameters of the dielectric spacer 375. In particular, the combination of materials used and holes 502 may provide a desirable CTE and a desirable dielectric constant which may be unavailable for commercial purpose. At least one of the CTE values and dielectric values allow the dielectric spacer 375 to achieve desirable beamforming capabilities and steering of the antenna apparatus 200, as well as a desirable signal-to-noise (SNR) ratio for received signals. For example this combination may provide a layer having a dielectric constant of between 1 and 5, between 2 and 4, between 2.5 and 3.5, or about 2.8; and a CTE of between 10 and 30, between 15 and 25, between 17 and 23, or about 20. In an exemplary embodiment, the dielectric spacer 375 may have a dielectric constant of about 2.8 and a CTE of about 20. Where used in this context, the term "about" refers to the referenced value plus or minus 10 percent of the referenced value. As referenced above, materials are unavailable for commercial purpose with these properties.

PCB Assembly

In some embodiments and as shown in FIG. 3B, the patch antenna assembly 334 may be mechanically and electrically supported by a printed circuit board (PCB) assembly 380. The PCB assembly 380 is generally configured to connect electronic components using conductive tracks, pads and other features etched from one or more sheet layers of copper laminated onto and/or between sheet layers of a non-conductive substrate. The PCB assembly 380 may be a single or multilayer assembly with various layers including copper, laminate, substrates, and the like, and may have various circuits formed therein.

Referring to FIGS. 3B, 8B, 9A, 9B, and 9C, the PCB assembly 380 may have a first side 383 that faces and contacts the dielectric spacer 375 and a second side 384 opposite the first side 383. The PCB assembly 380 may include a plurality of electronic components 382 coupled thereto, such as microchips, processors, signal processors, beamforming logic devices, power modules, GPS receivers, resistors, capacitors, inductors, transistors, memory devices, and the like. Because the first side 383 faces the dielectric spacer 375 and the electronic components 382 may extend away from the PCB assembly 380, it may be undesirable for such electronic components 382 to be located on the second side 384 of the PCB assembly 380. Due to the lack of electronic components on the first side 383 extending away from the first side 383, the first side 383 may be in contact with and lie flush with the dielectric spacer 375. Additional electronic components (such as signal traces or other logic devices) may be located within the layers of the PCB assembly 380 so long as they avoid extending outward from the first side 383. In that regard, thermal energy generated by, or dispersed by, the PCB assembly 380 may travel away from the PCB assembly 380 to the dielectric spacer 375.

The PCB assembly 380 may define or include a plurality of ports 381 extending through the first side 383 and the second side 384. The ports 381 may be aligned with the ports 331, 332, 333 of the antenna layers and some holes 502 of the dielectric spacer 375. In that regard, the elongated members 400 of the radome assembly 305 may extend through the ports 381 of the PCB assembly to couple the radome assembly 305 to the PCB assembly 380 and, thus, coupling the layers of the antenna stack assembly 250 together (see FIG. 10).

Coupling of Antenna Stack Assembly

In some embodiments, mechanical fasteners may be used to couple together the layers of the antenna stack assembly 250. In particular and as shown in FIGS. 4B and 10, the radome body assembly 310 may include a plurality of elongated members extending therefrom in a direction away from the radome body portion 402.

Each of the additional layers (beyond the radome body assembly 310) may have openings or apertures that each align in the direction of the stacking axis with at least one of the elongated members 400 in response to each of the layers being aligned for assembly. For example, the upper patch antenna layer 330 defines ports 332, the antenna spacer 335 defines ports 331, the lower patch antenna layer 370 defines ports 333, the dielectric layer 375 defines openings 502, and the PCB assembly 380 defines ports 381. Each of the ports 332, 331, 333, 502, 381 may align vertically, or along the stacking axis, with the elongated member 400. In some embodiments, some or all of the openings may serve multiple purposes. For example, the ports 331 in the antenna spacer 335 may also operate as cell centers (e.g., be surrounded by cell walls of the antenna spacer 335) such that additional openings beyond the cells are unnecessary. Likewise, the openings 502 of the dielectric layer may also operate as the openings formed therein that align with the antenna elements antenna assembly. In some embodiments, at least some ports 331 in the antenna spacer 335 may be formed separate from the cell centers. In some embodiments, at least some openings 502 in the dielectric layer 375 may be formed separate from the other openings of the dielectric layer 375 (e.g., to avoid an elongated member 400 extending through an antenna element). In that regard, the antenna spacer 335 may be designed to facilitate alignment of the ports 331 and the cell centers or to avoid alignment of the ports 331 and the cell centers. Similarly, the dielectric layer 375 may be designed to facilitate alignment of the functional openings and the fastening openings 502 or to avoid alignment of the functional openings and the fastening openings 502.

Figure 10:
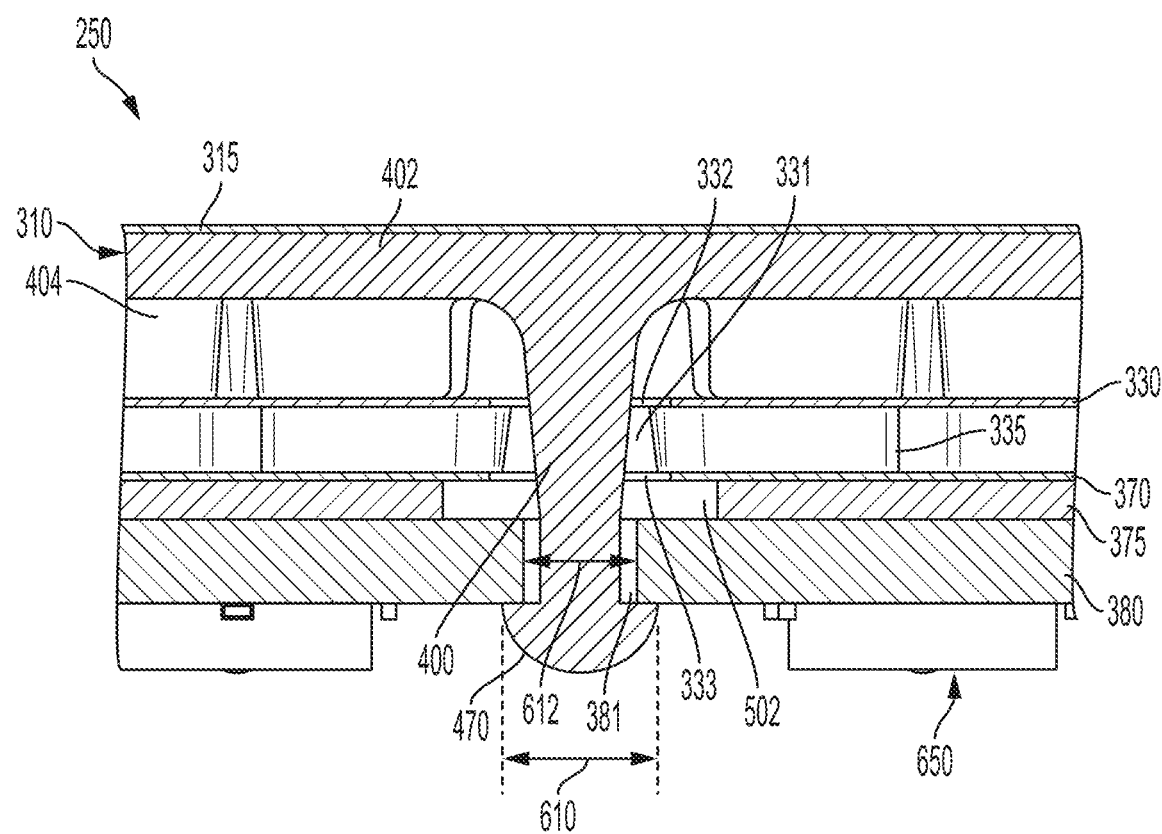
FIG. 10 is an enlarged cross-sectional view of a center portion of an antenna stack of the antenna assembly of FIGS. 2A and 2B illustrating use of elongated members of a radome body assembly to couple elements of the antenna stack together in accordance with embodiments of the present disclosure.

In order to couple the layers of the antenna stack assembly 250 together, the layers may be stacked in order (e.g., with the radome assembly 305 at one end and the PCB assembly 380 at the other, with the remaining layers stacked in the same configuration shown in FIGS. 3B and 10) in such a manner that the elongated members 400 extend through the openings of the respective layer. In particular, the elongated members 400 may extend through the openings of the layers in the following order (starting from the closest opening to the radome body assembly 310): 332, 331, 333, 502, 381. The elongated members 400 may each include a proximal end at or near the radome body portion 402 and a distal end opposite the proximal end (i.e., the distal end extends away from the radome body portion 402). Stated differently, the proximal end of the elongated members 400 may be coupled to the radome body assembly 310 (such as the radome body portion 402, the radome spacer portion 404, or the like). The distal end of the elongated members 400 may extend through each of the openings 332, 331, 333, 502, 381 and the distal end may be deformed, as discussed further below, to resist removal of the distal end from the openings 332, 331, 333, 502, 381. The layers may be pressed together using any known technique such as manual pressing, mechanical pressing, use of a vice, or the like. In some embodiments, the pressing may continue until the coupling is complete, may only occur until the layers are in the desired configuration, or for any duration therebetween.

While the layers are pressed together and the elongated members 400 extend through the openings, distal ends 470 of the elongated members may be warped or otherwise deformed. For example, the distal ends 470 may be heated, may be heated and reshaped manually or with equipment, may have pressure applied thereto for reshaping, or the like. The distal ends 470 may be manipulated such that a dimension 610 of the distal end 470 in a direction parallel to a plane formed by the PCB assembly 380 is greater than a diameter 612 of the port 381 of the PCB assembly 380. The distal end 470 may be manipulated in such a way that the dimension 610 that is greater than the diameter 612 is at a location adjacent to (i.e., within 1 mil (0.0254 mm), 10 mils (0.254 mm), 100 mils (2.54 mm), 300 mils (7.62 mm), or the like) a plane defined by the PCB assembly 380 while the layers are pressed together.

After hardening of the distal end 470, the elongated members 400 couple the entire antenna stack assembly 250 (see FIG. 3B) from the radome body assembly 310 (due to the monolithic nature thereof) to the PCB assembly (due to the dimension 610 of the distal end 470 being greater than the diameter 612 of the port 381 while the layers are stacked together). Thus, the elongated members 400 may resist separation of the radome body assembly 310 from the remaining layers of the antenna stack assembly in the direction of the stacking axis, and may also resist separation of the PCB assembly 380 from the remaining layers of the antenna stack assembly in the direction of the stacking axis. Because the elongated members 400 also extend through openings of the remaining layers and the remaining layers are sandwiched between the radome body assembly 310 and the PCB assembly, the elongated members 400 also resist separation of any one of the layers from any other of the layers. Furthermore, because the elongated members 400 extend through openings defined by each layer of the antenna stack assembly, the elongated members 400 also resist separation of any layer from any other layer in directions parallel to the plane defined by surfaces of the layers.

Although the outer layer 315 of the radome assembly 305 may not be coupled to the remaining layers via the elongated members, the outer layer 315 may be bonded to the radome body portion 402 using an adhesive (e.g., pressure-sensitive adhesive) or any other mechanism (e.g., other types of bonding such as chemical bonding). Therefore, the adhesive of the outer layer 315 and the interaction between the elongated members 400 and the openings may sufficiently couple each layer of the antenna stack assembly 250 together without use of any additional adhesive. In some embodiments, adhesive, fasteners, or other coupling means may be used to couple two or more layers of the antenna stack assembly 250 together. In some embodiments, the outer layer 315 may be coupled to the radome body portion 402 in any manner in addition to, or instead of, the adhesive. For example, another fastener (e.g., screw, bolt, snap-fit connector, clip, or the like) may be used to fasten or couple the outer layer 315 to the radome body portion.

In some embodiments, the PCB assembly 380 may include electronic components 650 (e.g., semiconductor processors, memory chips, global positioning system (GPS) sensors, or the like) located on, and coupled to, the PCB assembly 380. In some embodiments, the components 650 may be located on a bottom surface (e.g., a surface facing away from the remaining layers of the antenna stack assembly 250) due to potential direct contact between a top surface of the PCB assembly 380 (i.e., opposite the bottom surface) and the dielectric layer 375. In that regard, the components 650 may remain coupled to the antenna stack assembly 250 due to the coupling of the components 650 to the PCB assembly 380.

In some embodiments, some or all of the layers of the antenna stack assembly 250 may be coupled together using any additional or alternative method. In some embodiments, the distal end 470 may be coupled to the PCB assembly in another manner. For example, the distal end 470 may be bonded to the PCB layer (and, potentially, additional layers). As another example, a clip may be positioned on the distal end 470 while it is protruding through the port 381 to resist separation of the distal end 470 and the PCB assembly 380.

In some embodiments, another one or more layer of the antenna stack assembly 250 may include or be coupled to elongated members. For example, the PCB assembly 380 may be formed to have a monolithic elongated member, or an elongated member may be coupled thereto after formation of the PCB assembly 380. The elongated member may extend through at least one additional layer and may have a distal end that is reshaped (or bonded, or a clip coupled thereto) while extending through the other one or more layer to resist separation of the one or more layer and the PCB assembly 380.

In some embodiments, other fasteners may be used to couple two or more layers together in addition to, or instead of, the elongated members. For example, a rivet, bolt, screw, clip, snap-fit connector, or any other fastener may extend through two or more layers of the antenna stack assembly 250 in order to couple the two or more layers together.

In some embodiments, multiple mechanisms may be used to couple the antenna stack assembly 250 together. For example, an elongated member may extend from the radome body assembly 310 through the antenna spacer 335 and be coupled thereto, and rivets may be used to couple the antenna spacer 335 and the PCB assembly 380 together. As another example, a bolt may extend through openings defined by each layer (including the outer layer 315) and may have a head located outside of one opening (e.g., located above the outer layer 315) and be coupled to a nut outside of another opening (e.g., located below the PCB assembly 380) in order to resist separation of each layer relative to the remaining layers. In some embodiments, a fastener may be used to couple one or more layer of the antenna stack assembly 250 to the lower enclosure 204 in addition to, or instead of, the method discussed below.

As will be discussed below, the radome body assembly 310 may be disposed within or coupled to the lower enclosure 204 (see, e.g., FIG. 3B). The lower enclosure may include protrusions 390 (which may have any shape such as triangular prism, pyramid, tube, or the like) which may be located in the volume 258 and may extend upward (e.g., towards the radome body assembly 310). The protrusions 390 may be sufficiently long so as to contact (and potentially apply pressure to) the PCB assembly 380 in response to coupling between the radome body assembly 310 and the lower enclosure 204. In that regard, the contact between the protrusions 390 and the PCB assembly 380 (when the lower enclosure 204 is coupled to the radome body assembly 310), and/or the pressure applied through the stack to the radome body assembly 310, may be sufficient to retain the layers of the antenna stack assembly together without use of adhesives, fasteners, or other coupling means. This contact (and potential pressure) between the protrusions 390 and the PCB assembly 380 may provide support to one or more layer of the antenna stack assembly 250.

In some embodiments, multiple coupling mechanisms may be used in some or all locations to provide redundant couplings. For example, the elongated member 400 may be used as shown in FIG. 10, and adhesive may be applied between two or more additional layers (e.g., the upper patch antenna layer 330, the antenna spacer 335, and the lower patch antenna layer 370) to provide redundant coupling. As another example, the outer layer 315, radome body assembly, upper patch antenna layer 330, and antenna spacer 335 may be coupled together using a first fastener; the antenna spacer 335, the lower patch antenna layer 370, the dielectric layer 375, and the PCB assembly 380 may be coupled together using a second fastener; and adhesive may be used to couple the lower patch antenna layer 370 to the dielectric layer 375.

In some embodiments, the elongated member 400 may be formed from a same material as the remainder of the radome body assembly 310. In some embodiments, the elongated member 400 may be strengthened, for example by using a coating, to increase its strength. In some embodiments, the elongated member 400 may be formed separate from the radome body assembly 310 and coupled to the radome body assembly 310 using any means (e.g., fasteners, adhesives, chemical bonding, or the like). In these embodiments, the elongated member 400 may be formed from the same or different material as the remainder of the radome body assembly 310. Similarly, any additional fasteners, connectors, or the like discussed herein may be formed from any material such as a polymer, a metal, or the like.

Coupling of Antenna Assembly

Figure 11:
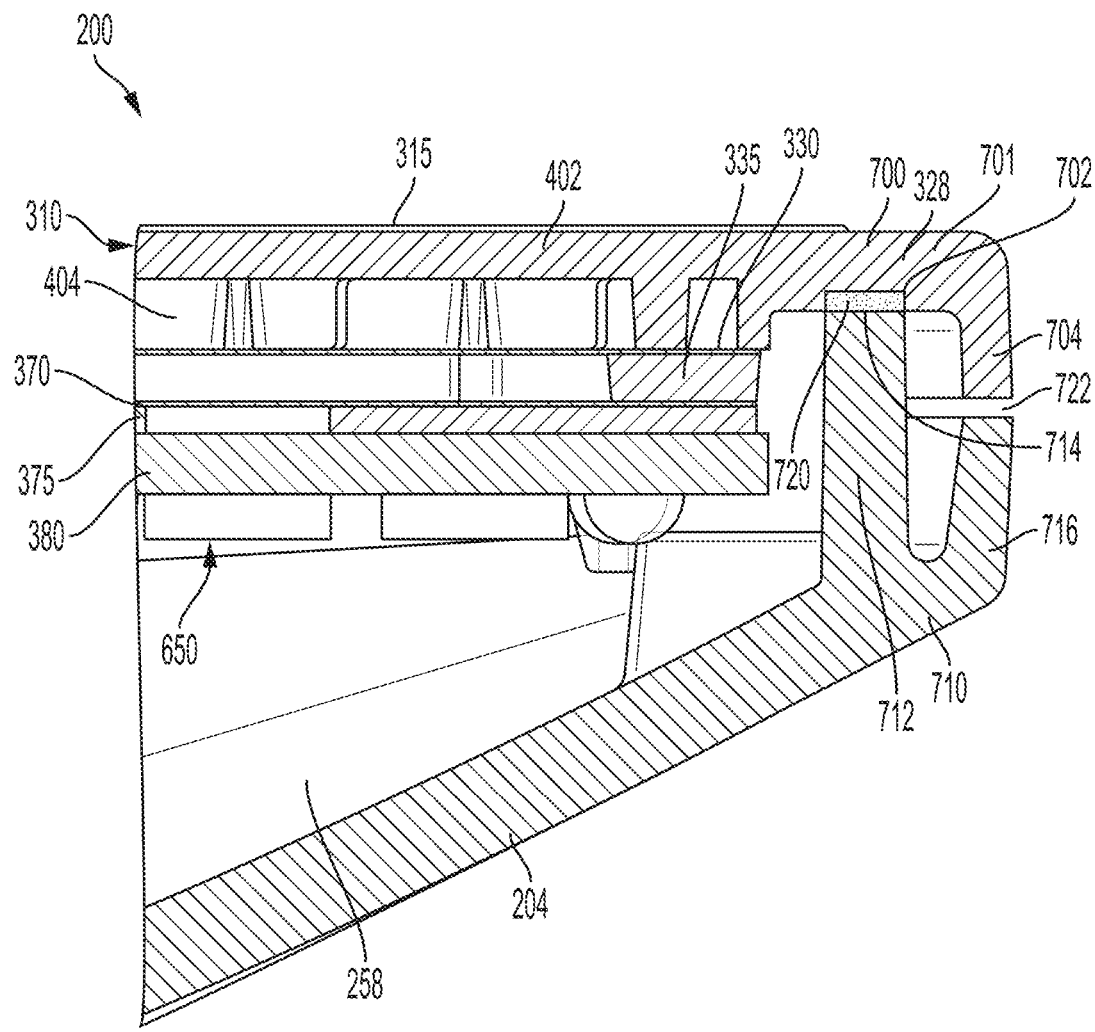
FIG. 11 is an enlarged cross-sectional view of an edge of the antenna assembly of FIGS. 2A and 2B illustrating the antenna assembly in an assembled state in accordance with embodiments of the present disclosure.

Turning to FIGS. 2A, 3B, and 11, the antenna stack assembly 250 may be coupled to the lower enclosure 204 to assemble the antenna assembly 200 together. As discussed above and in some embodiments, the antenna stack assembly 250 may be coupled together and then the antenna stack assembly 250 may be coupled to the lower enclosure 204. In some embodiments, the coupling between the radome body assembly 310 and the lower enclosure 204 may couple the layers of the antenna stack assembly 250 together.

The radome body assembly 310 (e.g., the radome body portion 402) may include a perimeter portion 700 which may be located at the exterior portion 328. The perimeter portion 700 may extend outward from (i.e., in a direction perpendicular to the stacking axis) some or all remaining layers of the antenna stack assembly 250 (e.g., may at least extend outward from the upper patch antenna layer 330, the antenna spacer 335, the lower patch antenna layer 370, the dielectric layer 375, and the PCB assembly 380). The perimeter portion 700 may extend outward from these layers around the entire perimeter of the radome body assembly 310. In some embodiments, the perimeter portion 700 may be an extension of the radome body portion 402. In some embodiments, the perimeter portion 700 may be an extension of the radome spacer portion 404. In some embodiments, the perimeter portion 700 may be an extension of at least a portion of both of the radome body portion 402 and the radome spacer portion 404. In some embodiments, the perimeter portion may fail to be aligned with one or both of the radome body portion 402 and the radome spacer portion 404.

In some embodiments, the outer layer 315 may extend to an outer edge of the perimeter portion 700. In some embodiments, the outer layer 315 may fail to extend onto the perimeter portion 700. In some embodiments, the outer layer 315 may extend a portion of the way onto the perimeter portion 700 but may end before the outer edge of the perimeter portion 700. The outer layer 315 may be precut to fit as desired, or may be applied to the radome body assembly 310 and then cut to a desired shape.

The perimeter portion 700 may include a parallel portion 701 that extends in a direction substantially parallel to the plane defined by the radome body portion 402. The perimeter portion 700 may further include a radome lip 704 that extends away from the parallel portion 701 and at least partially downward (i.e., towards the lower enclosure 204). In some embodiments, the radome lip 704 may form an angle with the parallel portion 701 that is between 45 degrees and 135 degrees, between 60 degrees and 120 degrees, between 75 degrees and 105 degrees, or about 90 degrees. The transition from the parallel portion 701 to the radome lip 704 may be angled, curved, or any combination thereof.

The parallel portion 701 of the perimeter portion 700 may have an inner surface (i.e., facing towards the lower enclosure 204) that extends from, for example, the radome spacer portion 404 to the radome lip 704. The inner surface may form a bonding surface 702 used to couple the radome body assembly 310 to the lower enclosure 204.

The lower enclosure 204 may also have a perimeter portion 710. The perimeter portion 710 of the lower enclosure 204 may extend around an entire perimeter of the lower enclosure 204. As shown, the lower enclosure 204 may be angled or slanted towards the perimeter portion 710 between the perimeter portion 710 and the interface between the post 210 and the lower enclosure 204. In some embodiments, the slant may only exist for a portion of the lower enclosure 204, may fail to exist, may exist along the entire lower enclosure 204, or the like. Similarly, the lower enclosure 204 may be curved instead of angled, may include a combination of angles and curves, or the like. This angled or slanted design of the lower enclosure aids in forming the volume 258 between the lower enclosure 204 and the PCB assembly 380. However, any other shape may be used for the lower enclosure 204 without departing from the scope of the present disclosure.

The perimeter portion 710 of the lower enclosure 204 may include a post 712 extending away therefrom in an upwards direction (i.e., towards the radome body assembly 310). For example, the post 712 may extend in a direction that is substantially perpendicular to the plane defined by the radome body portion 402. The post 712 may include an upper surface or edge which may be used as a bonding edge 714. The bonding edge 714 may include a surface or edge that is substantially parallel to the bonding surface 702 of the perimeter portion 700 of the radome body assembly 310. The perimeter portion 710 of the lower enclosure 204 may also include an enclosure lip 716 extending substantially parallel to (e.g., within 45 degrees of parallel, within 30 degrees, within 20 degrees, within 5 degrees, or the like) the radome lip 704, and may likewise extend substantially parallel to (e.g., within 45 degrees of parallel, within 30 degrees, within 20 degrees, within 5 degrees, or the like) the post 712. In some embodiments, the enclosure lip 716 may be spaced from the post 712 by a distance. In some embodiments, one or both of the radome lip 704 and the enclosure lip 716 may be optional.

The bonding edge 714 of the post 712 may be coupled to the bonding surface 702 of the parallel portion 701 of the radome body assembly 310. Because the bonding surface 702 and the bonding edge 714 extend around the entire perimeters of the radome body assembly 310 and the lower enclosure 204, the entire perimeters of the radome body assembly 310 and the lower enclosure 204 may be coupled together. This coupling between the bonding surface 702 and the bonding edge 714 may partially or entirely seal the volume 258 from an environment of the antenna assembly 200. Likewise, this coupling may be waterproof or water resistant (i.e., the radome body assembly 310 may be hermetically sealed to the lower enclosure 204). Thus, the coupling of the radome body assembly 310 to the lower enclosure 204 may reduce the likelihood of water or debris entering the volume 250. Thus, components within the volume (including the entire antenna stack 250 minus portions of the radome assembly 305) may be protected from water and debris that may be present in the environment of the antenna assembly 200.

The bonding surface 702 may be coupled to the bonding edge 714 in any manner. In some embodiments, an O-ring or other sealing member may be present between the bonding surface 702 and the bonding edge 714 and a fastener may be used to fasten the lower enclosure 204 to the radome body assembly 310 such that the O-ring or other sealing member hermetically seals the volume 258 from the environment. In some embodiments, an adhesive may be placed between the bonding surface 702 and the bonding edge 714 and cured to couple the bonding surface 702 and the bonding edge 714 together. In some embodiments, the bonding surface 702 and the bonding edge 714 may be chemically bonded together.

In some embodiments, vibration welding may be used to couple the bonding surface 702 and the bonding edge 714 together. Vibration welding refers to a process in which two workpieces (the radome body assembly 310 and the lower enclosure 204) are brought into contact under pressure, and a reciprocating motion (e.g., vibration) is applied along the common interface (the bonding surface 702 and the bonding edge 714) to generate heat. The resulting heat melts the workpieces, and they become welded when the vibration stops and the interface cools. The vibration may be achieved either through linear vibration welding, which uses a one-dimensional back-and-forth motion, or orbital vibration welding which moves the pieces in small orbits relative to each other. The vibrations may operate at a frequency between 120 hertz and 360 hertz, between 200 hertz and 280 hertz, between 220 hertz and 260 hertz, about 240 hertz, or the like. The amplitude of the vibration may be, for example, between 20 mil and 118 mil (0.5 mm and 3 mm), between 40 mil and 78 mil (1 mm and 2 mm), or about 59 mil (1.5 mm).

The vibration weld between the bonding surface 702 and the bonding edge 714 may result in a hermetic seal formed around the entire bonding surface 702 and the entire bonding edge 714. Vibration welding may be optimally performed using thermoplastics. In that regard and in some embodiments, the radome body assembly 310 and the lower enclosure 204 may include a thermoplastic (at least at the respective perimeter portions 700, 710). In some embodiments, one or both of the radome body assembly 310 and the lower enclosure 204 may include a different material. For example, the radome body assembly 310 may include a thermoplastic and the lower enclosure 204 may include a non-thermoplastic polymer or a metal. In some embodiments, both the radome body assembly 310 and the lower enclosure 204 may include a non-thermoplastic polymer or a metal.

In some embodiments, a different bonding technique may be used. For example, ultrasonic welding may be used to bond two thermoplastics, a thermoplastic and a metal, two metals, or the like together. Ultrasonic welding is a process in which high-frequency (e.g., between 20 kilohertz and 40 kilohertz) ultrasonic acoustic vibrations are locally applied to workpieces (i.e., the radome body assembly 310 and the lower enclosure 204) being held together under pressure to create a solid-state weld. Ultrasonic welding may be particularly useful when the two workpieces are formed using dissimilar materials (e.g., a polymer for one and a metal for the other).

After the vibration welding, ultrasonic welding, or other coupling technique is completed, a joint 720 may be present between the bonding surface 702 and the bonding edge 714. The joint 720 may also operate as a hermetic seal, sealing the volume 258 from the environment of the antenna assembly 200.

After the bonding surface 702 and the bonding edge 714 have been bonded together (e.g., using vibration welding, ultrasonic welding, or any other coupling technique), a gap 722 may be present between the radome lip 704 and the enclosure lip 716. In some embodiments and due to variation present in various welding applications, the joint 720 between the post 712 and the bonding surface 702 may be sufficiently large (e.g., by melting a sufficiently large portion of the post 712 so as to reduce its height along the stacking axis) to cause the gap 722 to be nonexistent. However, in some embodiments, the joint 720 may not remove this quantity of material from the post 712. In that regard, the presence of the gap 722 between the radome lip 704 and the enclosure lip 716 may provide the appearance of a close seal between the radome body assembly 310 and the lower enclosure 204 while providing for the variation in welding applications. Although the gap 722 may be present between the radome lip 704 and the enclosure lip 716 such that water and debris may pass through the gap 722, the seal between the bonding surface 702 and the bonding edge 714 of the post is sufficient to resist entry of this water or debris into the volume 258 in which sensitive electronic components may be located.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language and language within the specification reciting "at least one of" refers to at least one of a set and indicates that one member of the set or multiple members of the set satisfy the claim. For example, claim language and language within the specification reciting "at least one of A and B" means A, B, or A and B. As another example, claim language and language within the specification reciting "at least one of A or B" means A, B, or A and B.

The invention claimed is:

1. An antenna assembly comprising:
    a housing including a radome having at least an outer layer made of a melt-processable fluoropolymer material and a lower enclosure coupled to the radome, wherein the housing defines an internal volume between the radome and the lower enclosure, and wherein the radome defines a first side and a second side, the first side including the outer layer; and
    an antenna system disposed within the internal volume of the housing, wherein the antenna system includes an antenna layer having a plurality of elements coupled to the antenna layer, and wherein the second side of the radome couples to the antenna layer.

2. The antenna assembly of claim 1, wherein the melt-processable fluoropolymer material includes at least one of ethylene tetrafluoroethylene (ETFE), fluorinated ethylene propylene (FEP), perfluoroalkoxy alkane (PFA), and plasma treated ethylene chlorotrifluoroethylene (ECTFE).

3. The antenna assembly of claim 2, wherein the melt-processable fluoropolymer material is ethylene tetrafluoroethylene (EFTE).

4. The antenna assembly of claim 2, wherein at least a portion of the radome is made from a polymer that is different than the melt-processable fluoropolymer material of the outer layer.

5. The antenna assembly of claim 4, wherein the polymer that is different than the melt-processable fluoropolymer material of the outer layer further comprises a strengthening material.

6. The antenna assembly of claim 5, wherein the strengthening material is a fiberglass.

7. The antenna assembly of claim 2, wherein the radome further comprises an ultraviolet (UV) light blocking additive.

8. The antenna assembly of claim 7, wherein the ultraviolet (UV) light blocking additive is titanium dioxide (TiO2).

9. The antenna assembly of claim 1, wherein the antenna system is a phased array antenna system.

10. The antenna assembly of claim 1, wherein the antenna system is a patch antenna system.

11. The antenna assembly of claim 1, wherein the antenna system is tilted from a horizontal orientation.

12. The antenna assembly of claim 1, wherein the outer layer of the radome is formed by extruding the melt-processable fluoropolymer material.

13. The antenna assembly of claim 12, wherein the outer layer of the radome is coupled with a radome body portion of the radome using a pressure sensitive adhesive.

14. The antenna assembly of claim 12, wherein the outer layer of the radome is coupled with a radome body portion of the radome by activating a first surface of the extruded melt-processable fluoropolymer material for bondability.

15. An antenna assembly, comprising:
    a housing including a radome body portion coupled to a lower enclosure, wherein the housing defines an internal volume;
    a planar surface formed from a melt-processable fluoropolymer material and having a first side configured to be coupled to the radome body portion and a second side configured to be exposed to an environment of the antenna assembly;
    a pressure sensitive adhesive (PSA) coupled to the first side of the planar surface and configured to couple the first side of the planar surface to the radome body portion; and
    an antenna layer disposed within the internal volume of the housing, wherein the antenna layer includes a plurality of antenna elements coupled to the antenna layer, and wherein the antenna layer is coupled to the radome body portion.

16. The antenna assembly of claim 15, wherein the melt-processable fluoropolymer material includes at least one of ethylene tetrafluoroethylene (ETFE), fluorinated ethylene propylene (FEP), perfluoroalkoxy alkane (PFA), and plasma treated ethylene chlorotrifluoroethylene (ECTFE).

17. The antenna assembly of claim 15, wherein the melt-processable fluoropolymer material is shaped using extrusion prior to the PSA being coupled to the first side of the planar surface.

18. An antenna assembly, comprising:
    a lower enclosure;
    a radome body portion coupled to the lower enclosure to form at least a part of a housing for the antenna assembly, wherein the lower enclosure and radome body portion define an internal volume;
    a planar surface formed from a melt-processable fluoropolymer material and having a first side configured to be coupled to the radome body portion and a second side configured to be exposed to an environment of the antenna assembly; and
    an antenna layer disposed within the internal volume, wherein the antenna layer includes a plurality of antenna elements coupled to the antenna layer, and wherein the antenna layer is coupled to the radome body portion.

19. The antenna assembly of claim 18, wherein the melt-processable fluoropolymer material includes at least one of ethylene tetrafluoroethylene (ETFE), fluorinated ethylene propylene (FEP), perfluoroalkoxy alkane (PFA), and plasma treated ethylene chlorotrifluoroethylene (ECTFE).

20. The antenna assembly of claim 18, wherein the radome body portion is made from a polymer that is different than the melt-processable fluoropolymer material.

* * * * *